US012641052B2

(12) United States Patent
Tamizkar

(10) Patent No.: US 12,641,052 B2
(45) Date of Patent: May 26, 2026

(54) METHODS AND DEVICES FOR SWITCHING DATA FRAMES IN A COMMUNICATIONS NETWORK

(71) Applicant: Telia Company AB, Solna (SE)

(72) Inventor: Babak Tamizkar, Stockholm (SE)

(73) Assignee: Telia Company AB (SE)

( * ) Notice: Subject to any disclaimer, the term of this patent is extended or adjusted under 35 U.S.C. 154(b) by 39 days.

(21) Appl. No.: 18/672,060

(22) Filed: May 23, 2024

(65) Prior Publication Data

US 2024/0396862 A1 Nov. 28, 2024

(30) Foreign Application Priority Data

May 23, 2023 (SE) .................................... 2350628-0

(51) Int. Cl.
*H04L 61/103* (2022.01)
*H04L 45/00* (2022.01)
(Continued)

(52) U.S. Cl.
CPC ............ *H04L 61/103* (2013.01); *H04L 45/66* (2013.01); *H04L 45/745* (2013.01); *H04L 2101/622* (2022.05)

(58) Field of Classification Search
CPC ..... H04L 61/103; H04L 45/66; H04L 45/745; H04L 2101/622; H04L 61/2596; H04L 49/3009
See application file for complete search history.

(56) References Cited

U.S. PATENT DOCUMENTS 11,088,945 B1 * 8/2021 Deshpande ............. H04L 49/25
11,601,296 B2 * 3/2023 Wijnands ................ H04L 12/18
(Continued)

FOREIGN PATENT DOCUMENTS

EP 3684016 A1 7/2020
EP 3 855 685 A1 7/2021
WO WO 2020/076061 A1 4/2020

OTHER PUBLICATIONS

Scott, Malcolm et al., "Addressing the Scalability of Ethernet with MOOSE" Retrieved from <https://www.cl.cam.ac.uk/~mas90/MOOSE/MOOSE.pdf> (Year: 2015).*
(Continued)

*Primary Examiner* — Brian J. Gillis
*Assistant Examiner* — Juan C Turriate Gastulo
(74) *Attorney, Agent, or Firm* — Burr & Forman LLP; Nathaniel T. Quirk, Esq.

(57) ABSTRACT

Methods and switch devices for switching data frames are described. A method performed by a source switch device may include receiving a data frame from a source host node, wherein the data frame includes a MAC address of the source host node and a destination MAC address; modifying the received data frame by modifying a part of the source MAC address in the received data frame with information comprising: the switch ID, a port number and a reference number; and determining if there is a table in the source switch device. Further, if the received data frame is an ARP request message, the method may include modifying the modified data frame by replacing a sender MAC address with the modified part of the source MAC address and flooding the further modified data frame, to at least one switch device.

11 Claims, 7 Drawing Sheets

(51) Int. Cl.
   *H04L 45/745*      (2022.01)
   *H04L 101/622*     (2022.01)

(56)                References Cited

U.S. PATENT DOCUMENTS

| | | | |
|---|---|---|---|
| 2007/0201490 A1 | 8/2007 | Mahamuni | |
| 2007/0288653 A1 | 12/2007 | Sargor et al. | |
| 2008/0181243 A1 | 7/2008 | Vobbilisetty et al. | |
| 2010/0278485 A1 | 11/2010 | Jarredal | |
| 2011/0007741 A1 | 1/2011 | Kreeger et al. | |
| 2011/0317703 A1* | 12/2011 | Dunbar | H04L 61/2596 |
| | | | 370/392 |
| 2013/0145008 A1 | 6/2013 | Kannan et al. | |
| 2016/0036773 A1* | 2/2016 | Luo | H04L 61/2503 |
| | | | 370/392 |
| 2016/0330046 A1 | 11/2016 | Yang et al. | |

OTHER PUBLICATIONS

Swedish Search Report, May 23, 2023, Patent Application No. 2350628-0, Swedish Patent and Registration Office.
Addressing the Scalability of Ethernet with MOOSE, Malcolm Scott, Daniel Wagner-Hall, Andrew Moore and Jon Crowcroft, University of Cambridge Computer Laboratory.
European Patent Application No. EP24176854, Partial European Search Report, by Yves Lebas, Oct. 2, 2024.
"Addressing the Scalability of Ethernet with MOOSE", M. Scott et al., Internet Engineering Task Force, University of Cambridge, Oct. 18, 2010.

\* cited by examiner

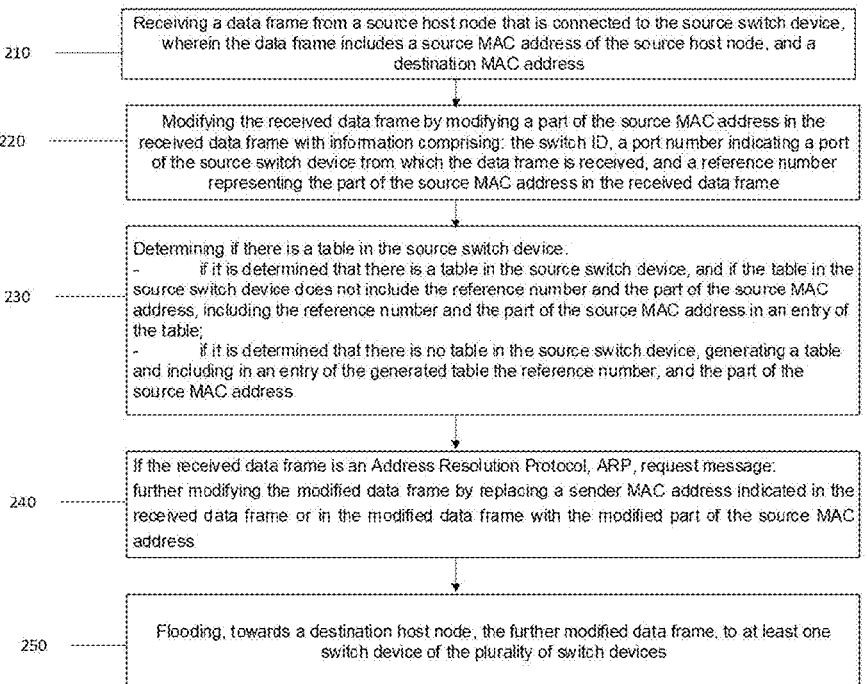

210 — Receiving a data frame from a source host node that is connected to the source switch device, wherein the data frame includes a source MAC address of the source host node, and a destination MAC address 220 — Modifying the received data frame by modifying a part of the source MAC address in the received data frame with information comprising: the switch ID, a port number indicating a port of the source switch device from which the data frame is received, and a reference number representing the part of the source MAC address in the received data frame 230 — Determining if there is a table in the source switch device.
- if it is determined that there is a table in the source switch device, and if the table in the source switch device does not include the reference number and the part of the source MAC address, including the reference number and the part of the source MAC address in an entry of the table;
- if it is determined that there is no table in the source switch device, generating a table and including in an entry of the generated table the reference number, and the part of the source MAC address 240 — If the received data frame is an Address Resolution Protocol, ARP, request message: further modifying the modified data frame by replacing a sender MAC address indicated in the received data frame or in the modified data frame with the modified part of the source MAC address 250 — Flooding, towards a destination host node, the further modified data frame, to at least one switch device of the plurality of switch devices

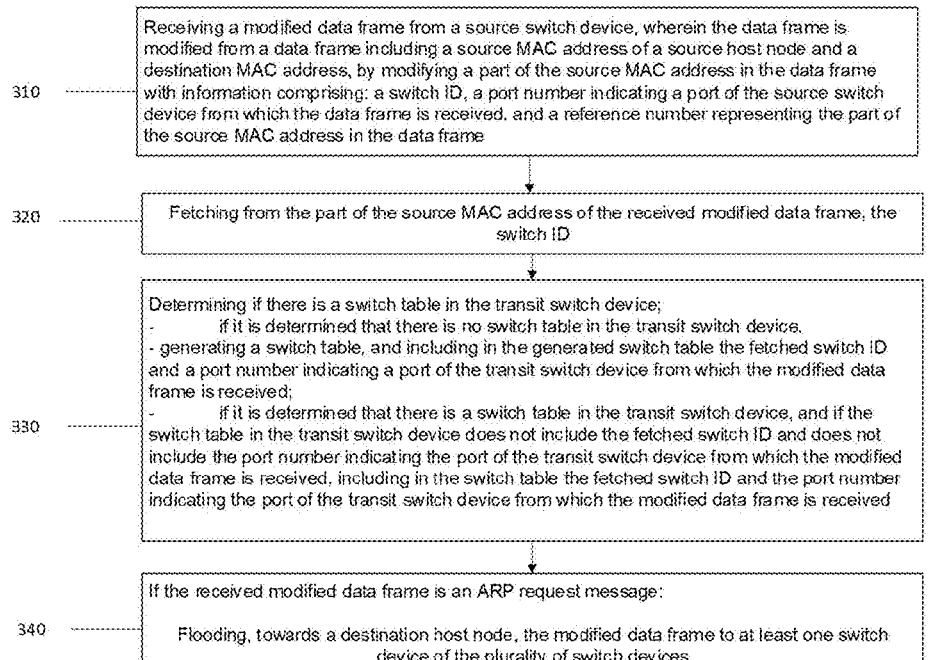

310 ---------- Receiving a modified data frame from a source switch device, wherein the data frame is modified from a data frame including a source MAC address of a source host node and a destination MAC address, by modifying a part of the source MAC address in the data frame with information comprising: a switch ID, a port number indicating a port of the source switch device from which the data frame is received, and a reference number representing the part of the source MAC address in the data frame 320 ---------- Fetching from the part of the source MAC address of the received modified data frame, the switch ID 330 ---------- Determining if there is a switch table in the transit switch device;
-      if it is determined that there is no switch table in the transit switch device,
- generating a switch table, and including in the generated switch table the fetched switch ID and a port number indicating a port of the transit switch device from which the modified data frame is received;
-      if it is determined that there is a switch table in the transit switch device, and if the switch table in the transit switch device does not include the fetched switch ID and does not include the port number indicating the port of the transit switch device from which the modified data frame is received, including in the switch table the fetched switch ID and the port number indicating the port of the transit switch device from which the modified data frame is received 340 ---------- If the received modified data frame is an ARP request message:

Flooding, towards a destination host node, the modified data frame to at least one switch device of the plurality of switch devices

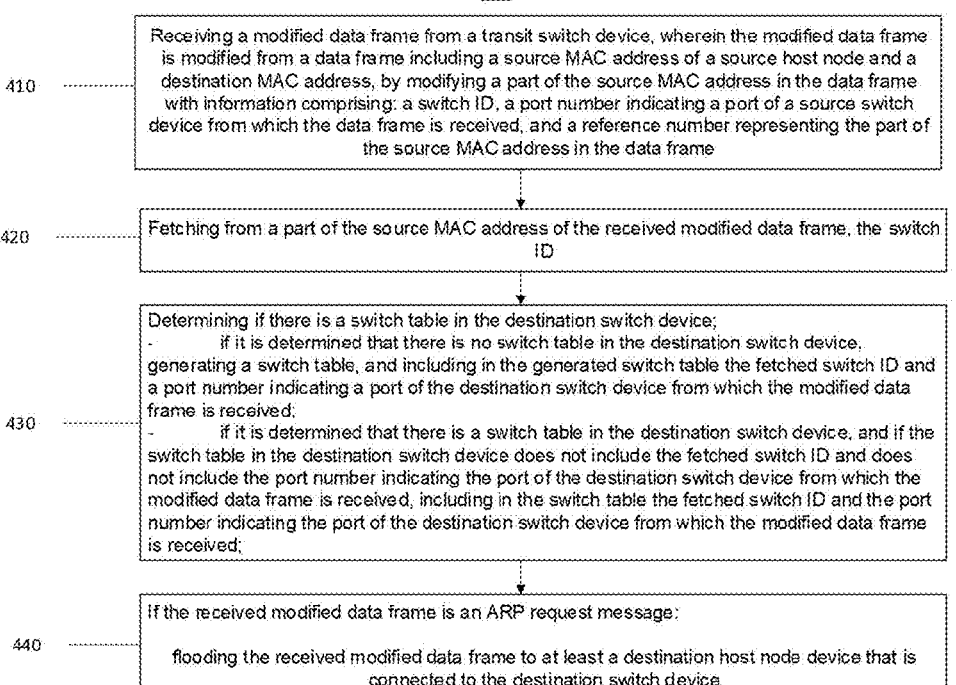

410 · · · · · · · · · · Receiving a modified data frame from a transit switch device, wherein the modified data frame is modified from a data frame including a source MAC address of a source host node and a destination MAC address, by modifying a part of the source MAC address in the data frame with information comprising: a switch ID, a port number indicating a port of a source switch device from which the data frame is received, and a reference number representing the part of the source MAC address in the data frame 420 · · · · · · · · · · Fetching from a part of the source MAC address of the received modified data frame, the switch ID 430 · · · · · · · · · · Determining if there is a switch table in the destination switch device;
- if it is determined that there is no switch table in the destination switch device, generating a switch table, and including in the generated switch table the fetched switch ID and a port number indicating a port of the destination switch device from which the modified data frame is received;
- if it is determined that there is a switch table in the destination switch device, and if the switch table in the destination switch device does not include the fetched switch ID and does not include the port number indicating the port of the destination switch device from which the modified data frame is received, including in the switch table the fetched switch ID and the port number indicating the port of the destination switch device from which the modified data frame is received;

440 · · · · · · · · · · If the received modified data frame is an ARP request message:

flooding the received modified data frame to at least a destination host node device that is connected to the destination switch device Transit Switch device
800

METHODS AND DEVICES FOR SWITCHING DATA FRAMES IN A COMMUNICATIONS NETWORK

TECHNICAL FIELD

The present disclosure relates to the field of data communications, and in particular to methods and devices for switching data frames in a communications network.

BACKGROUND

Switching is an approach of delivering data frames across the network, which is described in Layer 2 (L2), i.e., Data Link Layer of an Open Systems Interconnection (OSI) model. Switching methods decide how a switch device receives, processes, and forwards or floods the data frames.

A data frame may variously be referred to as an ethernet frame, a frame, and the like. A data frame starts with a header, which includes the source and destination Medium or Media Access Control (MAC) addresses, data type, among other data. The middle part of the data frame is the actual data. A data frame ends with a field called Frame Check Sequence (FCS). The data/ethernet frame structure is defined in the IEEE 802.3 standard.

A switch device may also be referred to as a switch. A switch device is capable of reading data frames. When a data frame enters into a port of the switch device, the switch device checks FCS field of the data frame and processes the data frame only when it is valid. All invalid data frames are automatically dropped. All valid data frames are processed and sent further to their destination MAC address.

The main tasks of a switch device are the following:

Learn where devices are located and store their locations (i.e., MAC addresses) in a MAC table.

Forward a data frame intelligently based on a MAC address of the data frame.

Remove Layer 2 switching loops.

To make accurate forwarding and filtering decisions, a switch device learns and stores MAC addresses of all connected devices. The switch device stores the learned MAC addresses in a table that is known as a MAC address table or a Content Addressable Memory (CAM) table. When a switch device receives a data frame, it associates the MAC address of the sending device with a switch port on which it was received.

Typically, a Layer two switching uses the following terms:

Flooding: Forwarding a data frame by a switch device on all its ports except the port that the data frame arrives at.

Broadcast frame: A data frame with FF:FF:FF:FF:FF:FF (i.e., hexadecimal format) as its destination MAC address. This address does not point to any specific host node. If a switch device receives a broadcast frame, it floods the frame. A broadcast frame may also be referred to as a broadcast message.

Unicast frame: A data frame with a specific destination MAC address pointing to a specific node. A unicast frame may also be referred to as a unicast message.

Known Unicast frame: A unicast frame for which a switch device has an entry in its MAC address table for the unicast frame's destination MAC address.

Unknown Unicast frame: A unicast frame for which a switch device does not have an entry in its MAC address table for the unicast frame's destination MAC address.

Two main challenges for switching in a Layer 2 domain are MAC address learning and broadcasting.

A first challenge is that each switch device, especially each transit switch device (i.e., a switch device that is not directly connected to a node), needs to learn MAC address for almost all the nodes communicating through the switch device. In mid to large-size networks with hundreds or thousands of nodes, a switch device needs to have a big MAC address table for registering the MAC address of any nodes whose data frames pass through the switch device. This challenge is particularly remarkable for transit switches, because almost all the traffic between all nodes passes through these transit switches. This can consume resources at a switch device and bring latency to the network due to computation overhead of registering new MAC addresses and searching for a MAC address in a large MAC address table.

A second challenge is broadcasting. Broadcasting is not just for a broadcast frame. For example, if a switch device receives a unicast frame but does not have any entry for the destination MAC address of the unicast frame in its MAC address table, the switch has to broadcast (i.e., flood) the unicast frame. This is common when a switch device does not have an entry for an arrived unicast frame. It may be because each switch device's MAC address table has limitation for registering MAC address entries. A switch device may not be able to keep MAC addresses for all connected nodes in the network. When its MAC address table gets full, the switch device starts to replace new entries with old ones. In addition, each entry in the switch device's MAC address table has a timer. The switch device only keeps an entry in its MAC address table for a certain period of time, and after that, the switch device removes that entry from its MAC address table. Broadcasting can lead to latency, more bandwidth utilization, and more usage of switch resources in the network.

In view of the above, there is a need for methods and devices for switching frames in a communications network that solve at least some of the problems described above.

SUMMARY

It is therefore an object of embodiments herein to solve at least the above problems by providing methods and switch devices as presented below.

According to an aspect of embodiments herein, there is provided a method performed by a source switch device for switching data frames in a communications network comprising a plurality of switch devices including the source switch device; the source switch device having a switch ID; the method comprising:

receiving a data frame from a source host node that is connected to the source switch device, wherein the data frame includes a source MAC address of the source host node, and a destination MAC address;

modifying the received data frame by modifying a part of the source MAC address field in the received data frame with information comprising: the switch ID, a port number indicating a port of the source switch device from which the data frame is received, and a reference number representing the part of the source MAC address in the received data frame;

determining if there is a table in the source switch device:

if it is determined that there is a table in the source switch device, and if the table in the source switch device does not include the reference number and the part of the source MAC address;

including the reference number and the part of the source MAC address in an entry of the table;

if it is determined that there is no table in the source switch device;

generating a table and including in an entry of the generated table the reference number, and the part of the source MAC address;

the method performed by the source switch device further comprising:

if the received data frame is an Address Resolution Protocol, ARP, request message:

further modifying the modified data frame by replacing a sender MAC address indicated in the received data frame or in the modified data frame with the modified part of the source MAC address; and flooding, towards a destination host node, the further modified data frame, to at least one switch device of the plurality of switch devices.

According to another aspect of embodiments herein, there is provided a method performed by a transit switch device, for switching data frames in a communications network comprising a plurality of switch devices including the transit switch device; the method comprising:

receiving a modified data frame from a source switch device, wherein the data frame is modified from a data frame including a source Media Access Control, MAC, address of a source host node and a destination MAC address, by modifying a part of the source MAC address in the data frame with information comprising: a switch ID, a port number indicating a port of the source switch device from which the data frame is received, and a reference number representing the part of the source MAC address in the data frame;

fetching from the part of the source MAC address field of the received modified data frame, the switch ID;

determining if there is a switch table in the transit switch device;

if it is determined that there is no switch table in the transit switch device, generating a switch table, and including in the generated switch table the fetched switch ID and a port number indicating a port of the transit switch device from which the modified data frame is received;

if it is determined that there is a switch table in the transit switch device, and if the switch table in the transit switch device does not include the fetched switch ID and does not include the port number indicating the port of the transit switch device from which the modified data frame is received;

including in the switch table the fetched switch ID and the port number indicating the port of the transit switch device from which the modified data frame is received; and if the received modified data frame is an Address Resolution Protocol, ARP, request message:

flooding, towards a destination host node, the modified data frame to at least one switch device of the plurality of switch devices.

According to a yet another aspect of embodiments herein, there is provided a method performed by a destination switch device for switching data frames in a communications network comprising a plurality of switch devices including the destination switch device, the method comprising:

receiving a modified data frame from a transit switch device, wherein the modified data frame is modified from a data frame including a source Media Access Control, MAC, address of a source host node and a destination MAC address, by modifying a part of the source MAC address in the data frame with information comprising: a switch ID, a port number indicating a port of a source switch device from which the data frame is received, and a reference number representing the part of the source MAC address in the data frame;

fetching from a part of the source MAC address field of the received modified data frame, the switch ID;

determining if there is a switch table in the destination switch device;

if it is determined that there is no switch table in the destination switch device, generating a switch table, and including in the generated switch table the fetched switch ID and a port number indicating a port of the destination switch device from which the modified data frame is received;

if it is determined that there is a switch table in the destination switch device, and if the switch table in the destination switch device does not include the fetched switch ID and does not include the port number indicating the port of the destination switch device from which the modified data frame is received, including in the switch table the fetched switch ID and the port number indicating the port of the destination switch device from which the modified data frame is received; and if the received modified data frame is an Address Resolution Protocol, ARP, request message:

flooding the received modified data frame to at least a destination host node device that is connected to the destination switch device.

According to another aspect of embodiments herein, there is also provided a source switch device for switching data frames in a communications network comprising a plurality of switch devices including the source switch device, the source switch device having a switch identity, switch ID, the source switch device comprising a processor and a memory, said memory containing instructions executable by said processor whereby said source switch device is operative to:

receive a data frame from a source host node that is connected to the source switch device, wherein the data frame includes a source Media Access Control, MAC, address of the source host node, and a destination MAC address;

modify the received data frame by modifying a part of the source MAC address in the received data frame with information comprising: the switch ID, a port number indicating a port of the source switch device from which the data frame is received, and a reference number representing the part of the source MAC address in the received data frame;

determine if there is a table in the source switch device:

if it is determined that there is a table in the source switch device, and if the table in the source switch device does not include the reference number and the part of the source MAC address;

include the reference number and the part of the source MAC address in an entry of the table;

if it is determined that there is no table in the source switch device;

generate a table and including in an entry of the generated table the reference number, and the part of the source MAC address;

if the received data frame is an Address Resolution Protocol, ARP, request message:

further modify the modified data frame by replacing a sender MAC address indicated in the received data frame or in the modified data frame with the modified part of the source MAC address; and flood, towards a destination host node, the further modified data frame, to at least one switch device of the plurality of switch devices.

According to another aspect of embodiments herein, there is also provided a transit switch device for switching data frames in a communications network comprising a plurality of switch devices including the transit switch device, wherein the transit switch device comprising a processor and a memory, said memory containing instructions executable by said processor whereby said transit switch device is operative to:

receive a modified data frame from a source switch device, wherein the data frame is modified from a data frame including a source Media Access Control, MAC, address of a source host node and a destination MAC address, by modifying a part of the source MAC address in the data frame with information comprising: a switch ID, a port number indicating a port of the source switch device from which the data frame is received, and a reference number representing the part of the source MAC address in the data frame;

fetch from the part of the source MAC address of the received modified data frame, the switch ID;

determine if there is a switch table in the transit switch device;

if it is determined that there is no switch table in the transit switch device, generate a switch table, and include in the generated switch table the fetched switch ID and a port number indicating a port of the transit switch device from which the modified data frame is received;

if it is determined that there is a switch table in the transit switch device, and if the switch table in the transit switch device does not include the fetched switch ID and does not include the port number indicating the port of the transit switch device from which the modified data frame is received;

include in the switch table the fetched switch ID and the port number indicating the port of the transit switch device from which the modified data frame is received; and if the received modified data frame is an Address Resolution Protocol, ARP, request message:

flood, towards a destination host node, the modified data frame to at least one switch device of the plurality of switch devices.

According to another aspect of embodiments herein, there is also provided a destination switch device for switching data frames in a communications network comprising a plurality of switch devices including the destination switch device, wherein the destination switch device comprising a processor and a memory, and said memory containing instructions executable by said processor whereby said destination switch device is operative to: receive a modified data frame from a transit switch device, wherein the modified data frame is modified from a data frame including a source Media Access Control, MAC, address of a source host node and a destination MAC address, by modifying a part of the source MAC address in the data frame with information comprising: a switch ID, a port number indicating a port of a source switch device from which the data frame is received, and a reference number representing the part of the source MAC address in the data frame;

fetch from a part of the source MAC address of the received modified data frame, the switch ID;

determine if there is a switch table in the destination switch device;

if it is determined that there is no switch table in the destination switch device, generate a switch table, and include in the generated switch table the fetched switch ID and a port number indicating a port of the destination switch device from which the modified data frame is received;

if it is determined that there is a switch table in the destination switch device, and if the switch table in the destination switch device does not include the fetched switch ID and does not include the port number indicating the port of the destination switch device from which the modified data frame is received, include in the switch table the fetched switch ID and the port number indicating the port of the destination switch device from which the modified data frame is received; and if the received modified data frame is an Address Resolution Protocol, ARP, request message:

flood the received modified data frame to at least a destination host node device that is connected to the destination switch device.

An advantage of the present disclosure is that there is no need for a MAC address table. Also, there is no unknown unicast frame due to the space limitation of a MAC address table where old entries are removed from the MAC address table, which lead to less broadcasting.

Another advantage of the present disclosure is that the resources usage at the switch devices are reduced. In addition, bandwidth utilization and latency of the network are also reduced.

Other objectives, features and advantages of the embodiments herein will be understood from following detailed description in conjunction with the drawings.

BRIEF DESCRIPTION OF THE DRAWINGS

Examples of embodiments herein are described in more detail with reference to drawings in which:

FIG. 2 is a flowchart of a method performed by a source switch device for switching data frames, according to some embodiments of the present disclosure;

FIG. 3 is a flowchart of a method performed by a transit switch device for switching data frames, according to some embodiments of the present disclosure; and FIG. 4 is a flowchart of a method performed by a destination switch device for switching data frames, according to some embodiments of the present disclosure.

DETAILED DESCRIPTION

In the following, a detailed description of the exemplary embodiments is presented in conjunction with the drawings to enable easier understanding of the solutions(s) described herein.

It is to be noticed that the terms "source switch device" and "source switch" may be used interchangeably in this disclosure. The terms "transit switch device" and "transit switch" may be used interchangeably in this disclosure. The terms "destination switch device" and "destination switch" may be used interchangeably in this disclosure. The terms "data frame" and "frame" may be used interchangeably in this disclosure.

It should be mentioned that the embodiments of the pending Swedish patent application SE 2350573-8 filed on May 9, 2023 before the Swedish Patent and Registration Office (PRV), are incorporated herein by reference in their entirety. Consequently, many of the embodiments of SE 2350573-8 are included in this disclosure. However, there are differencing technical features in this disclosure compared to the features of the embodiments of already filed SE 2350573-8, as will be explained herein.

Further, as disclosed in SE 2350573-8, the disclosed method(s) may be referred to as MAC-P (MAC Address Proxy) Version 1 (V1) based method(s).

In this disclosure, the method(s) herein may be referred to as MAC-P Version 2 (V2) based method(s). A switch device, being a source, a transit, or a destination device, performing a MAC-P V2 method may be referred to as a MAC-P V2 switch device for simplicity to allow the skilled person in understand the teaching of the embodiments of this disclosure.

Figure 1:
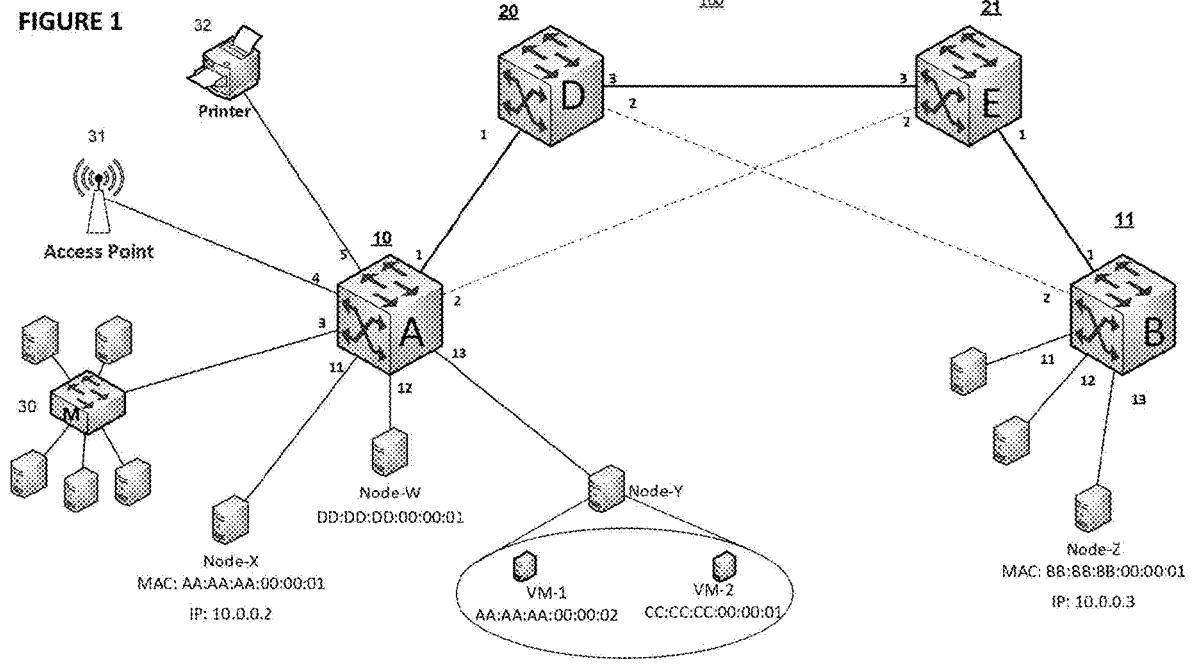
FIG. 1 schematically illustrates an example of a network topology at a Layer 2 domain, in accordance with some embodiments of the present disclosure.

Referring to FIG. 1, there is schematically illustrated an example of a communications network 100 at a Layer 2 domain. A Layer 2 domain is a boundary of connected switch devices with no router-to-router traffic between them. At a Layer 2 domain, nodes communicate with each other only through switch devices, so no traffic between them passes through a router. The communications network 100 may be a wired or wireless communication network such as an LTE, 4G, LTE-A (or LTE-Advanced), 5G, WiMAX, WiFi, WCDMA, GSM network, any 3GPP cellular network, or any cellular network or system.

It is shown in FIG. 1 several connected switch devices A, B, C and D. A switch device may be connected to any type of network device, such as a physical server, a virtual server that hosts one or more Virtual machines (VM), any devices with a standard MAC address (e.g., a printer), and the like. In FIG. 1, switch device A is directly connected to Node-X with MAC address: AA:AA:AA:00:00:01, Node-W with MAC address: DD:DD:DD:00:00:01, both of which are bare-metal/physical servers. Switch device A is also directly connected to Node-Y that is a virtual server which hosts two virtual machines (VM), that is, VM-1 with MAC address: AA:AA:AA:00:00:02 and VM-2 with MAC address: CC:CC:CC:00:00:01. A virtual server may host one or more virtual machines (VM) that run various operating systems and act as full computing platforms on their own through emulation and virtualization. Switch device A is further directly connected to a standard (i.e., non-MAC-P) switch device M which uses the standard method of MAC address table. Switch device A is further connected to an access point 31 and a printer 32. Switch device B is directly connected among others to a bare-metal/physical server Node-Z with MAC address: BB:BB:BB:00:00:01.

To have a better understanding of this present disclosure, some terms are explained below together with FIG. 1. A source host node (Node-X) is a node that initiates a communication with another node. A destination host node (Node-Z) is a node that the source host node intends to communicate with. A source switch device is a switch device that receives a data frame from a source host node. A destination switch device is a switch device that sends a data frame to a destination host node. A transit switch device is a switch device that is not directly connected to a source or destination host node. Instead, a transit switch device is between a source and a destination switch device.

Assume there is a data frame that is sent from Node-X to Node-Z, which passes through switch devices A, D, E and B, Node-X is the source host node and Node-Z is the destination host node. Switch device A is a source switch device since it received the data frame from the source host node Node-X. Switch device B is a destination switch device since it sends the data frame further to the destination host node Node-Z. Switch devices D and E are transit switch devices since they are not directly connected to either a source or a destination host node.

Every MAC-P switch device is further assigned a switch ID. For switch devices A, B, D and E, they are assigned to switch ID 10, 11, 20 and 21 (as underlined in FIG. 1). Switch devices A and B with switch ID 10 and 11 are switch devices that are directly connected to a source or a destination host node. They may therefore be referred to as access switches or source/destination switch device. It is to be noticed that FIG. 1 is only for illustration purpose. In some networks, the source and the destination host node may be connected to the same switch device. In that case, the source and destination switch device are the same switch device.

Switch devices D and E with switch ID 20 and 21 are core/aggregation switches that are not directly connected to a node. These switch devices are placed between access switches (i.e., source or destination switch device) to facilitate transferring data frames between a source and a destination host node. In some networks, there may be a three-layer structure for switching, that is, core layer, aggregation layer and access layer. In this present disclosure, core and aggregation layers are treated as one layer. Core and aggregation switches may both be referred to as a transit switch device. There may also be networks where a node is directly connected to a core/aggregation switch where the disclosed MAC-P method still applies.

In FIG. 1, each switch device has a number of ports as shown. These ports are defined into two categories according to our MAC-P method: switch port and access port. Switch port is a port of a MAC-P switch device where the port is directly connected to another MAC-P switch device. As an example, for switch device A with switch ID 10, port 1 and port 2 are switch ports. For switch device D with switch ID 20, ports 1, 2, and 3 are switch ports. Access Port is a port of a MAC-P switch device that is not directly connected to another MAC-P switch device but connected to a device capable of sending a standard data frame to the MAC-P switch device. The standard data frame comprises a standard source MAC address and a standard destination MAC address. As an example, for switch device A with switch ID 10, ports 3, 4, 5, 11, 12, and 13 are access ports. It is to be noted that port 13 of switch device A is directly connected to a virtual server which is also considered as a node. Therefore, port 13 of switch device A is considered as an access port. Ports 3, 4, and 5 of switch device A are connected to devices (i.e., a non-MAC-P standard switch device 30, an access point 31 and a printer 32) from which switch device A may receive standard data frames. Therefore, all those ports 3, 4 and 5 are considered as access ports. For switch device B with switch ID 11, ports 11, 12, and 13 are access ports. Technically, any port other than a switch port may be considered as an access port.

It can be seen from FIG. 1 the following information:

Switch-A (SW-A): 10

Switch-B (SW-B): 11

Switch-D (SW-D): 20

Switch-E (SW-E): 21

Each port of a switch device may be specified if it is an access port or a switch port.

SW-A:

Switch Ports: 1, 2

Access Ports: 3, 4, 5, 11, 12, 13

Port number 2 is not operational. It's disabled by spanning-tree protocol (STP).

SW-B:

Switch ports: 1, 2

Access ports: 11, 12, 13

Port number 2 is not operational. It's disabled by STP.

SW-D:

Switch ports: 1, 2, 3

Access ports:—

Port number 2 is not operational. It's disabled by STP.

SW-E:

Switch ports: 1, 2, 3

Access ports:—

Port number 2 is not operational. It's disabled by STP.

A protocol, such as the spanning-tree protocol (STP), may be used in a network to avoid network loops, broadcast/Unknown-unicast storm, frame duplication, and MAC addresses table corruption. When a protocol such as STP is used, some links between switch devices need to be in non-operational mode. These links are shown as dotted lines in FIG. 1. It can be seen from FIG. 1 that a data link between port 2 of switch device A and port 2 of switch device E is in non-operational mode. Another data link between port 2 of switch device D and port 2 of switch device B is also in non-operational mode.

A structure of a data frame may be seen below:

| Layer 2 address | | Ether | Payload |
|---|---|---|---|
| Destination MAC address | Source MAC address | Type XXXX | (Including L3 header) |
| "MAC of Destination Node" | "MAC of Source Node" | | |

It is to be noticed that the main focus of this present disclosure is Layer 2 MAC address parts of the data frame.

The "ether type" is a two-byte entry that shows what the type of the frame is. For instance, a frame with this code: 0806h shows this is an ARP frame, or 8870h is an ethernet frame.

Broadcast Frame:

A Broadcast frame is a frame with FF:FF:FF:FF:FF:FF (hexadecimal format) on its destination MAC address field when its "ether type" field doesn't point to an ARP frame. It means its "ether type" entry is something other than "0806h". This address does not point to any specific host. If a switch receives a typical broadcast frame, it floods the frame.

below is an example of such a Broadcast frame.

| Layer 2 address | | Ether | Payload |
|---|---|---|---|
| Destination MAC address | Source MAC address | Type Ethernet | (Including L3 header) |
| FF:FF:FF:FF:FF:FF | "MAC of Source Node" | 88:70 | |

The ether type in the above frame shows that the frame is an ethernet frame.

ARP Request Frame:

A frame with FF:FF:FF:FF:FF:FF (hexadecimal format) on its destination MAC address filed when its "ether Type" field points to an ARP frame. It means its "ether type" is "0806h". This address does not point to any specific host. If a switch receives a broadcast frame, it floods the frame.

An example of an ARP Request frame is shown below:

| Layer 2 address | | Ether | ARP Request header | | | |
|---|---|---|---|---|---|---|
| Destination MAC address | Source MAC address | Type ARP | Sender MAC address | Sender IP address | Target MAC address | Target IP address |
| FF:FF:FF:FF:FF:FF | "MAC of Source Node" | 08:06 | "MAC of Source Node" | "IP of sender node" | 00:00:00:00:00:00 | "IP of destination node" |

The ARP request is a frame sent by a source host node (e.g. Node-X) to find out the MAC address of a destination node with a known IP address.

As shown, the "sender MAC address" entry of the ARP request is the MAC address of the source node. On the other hand, the "target MAC address" field is "0". It's because the MAC address of the destination node is unknown for the source node.

A Unicast Frame:

Such a frame with a specific destination MAC address points to a particular node when its "ether Type" field doesn't point to an ARP frame. It means its "ether type" is something other than "0806h". Below is shown an example of such a Unicast frame:

| Layer 2 address | | Ether | Payload |
|---|---|---|---|
| Destination MAC address | Source MAC address | Type Ethernet | (Including L3 header) |
| "MAC of Destination Node" | "MAC of Source Node" | 88:70 | |

An ARP Reply Frame:

It is a frame with a specific destination MAC address points to a particular node when its "ether Type" field points to an ARP frame. It is like a typical unicast frame when its "ether type" is "0806h".

| Layer 2 address | | Ether | ARP Reply header | | | |
| --- | --- | --- | --- | --- | --- | --- |
| Destination MAC address | Source MAC address | Type ARP | Sender MAC address | Sender IP address | Target MAC address | Target IP address |
| "MAC of Destination Node" | "MAC of Source Node" | 08:06 | "MAC of Source Node" | "IP of sender node" | "MAC of Destination Node" | "IP of destination node" |

As shown, the "sender" and "target" MAC address fields both are non-broadcast MAC addresses. The ARP reply is a frame from a destination node that sends its MAC address to the requester (source node).

In this case, and in order to send a reply to an already received ARP request, the node that sends the ARP reply puts its MAC address inside the "sender MAC address" field and sets the "target MAC address" field of the ARP reply frame, the entry of the "sender MAC address" field already received by the ARP request frame.

Most standard switches, which work in layer two (L2), besides accessing the L2 header part of the frame, can also read the "ether-type". Like the below part:

| Layer 2 address | | Ether Type |
| --- | --- | --- |
| Destination MAC address | Source MAC address | Ethernet |
| "MAC of Destination Node" | "MAC of Source Node" | ??? |

Standard L2 switches have access to the Etheretype to support the 802.1Q (Vlan/Trunk) technology. L2 switches read the "ethertype" to see if the frame is tagged or not to take the necessary decision accordingly.

Switch devices, in accordance with the embodiments of the present invention read the "ethertype" field (i.e., an ether type field), but only for the source and destination switch devices. Transit switch devices need only look at the L2 part (destination and source MAC address).

According to an embodiment herein, the source switch device and the destination switch device have access to the ARP header part of the frame when a frame is an ARP Request or ARP Reply frame. For any other type of frame, switch devices need only to look at the L2 part of the frame.

A standard MAC address is a unique 48-bit data divided into two 24-bit parts. It may be shown as a 12-digit hexadecimal number (i.e., 6-Byte binary number), usually represented by Colon-Hexadecimal notation.

The leftmost 24-bit part (6-digits, e.g., 00:40:96) may be a unique ID, known as Organizationally Unique Identifier (OUI), that is assigned by IEEE to each manufacturer of Network Interface Controller (NIC). IEEE Registration Authority Committee assigns these MAC prefixes to its registered vendors.

Some examples of OUI for well-known manufacturers are the following:
CC:46:D6—Cisco
3C:5A:B4—Google, Inc.
3C:D9:2B—Hewlett Packard
00:9A:CD—HUAWEI TECHNOLOGIES CO., LTD The second 24-bit may be assigned by each vendor internally and known as Network Interface Controller (NIC). This NIC part is vendor specific for internal usage.

The combination of these two 24-bit parts creates an MAC address that is unique worldwide, which can be seen below.

| MAC Address 48-bit | |
| --- | --- |
| OUI 24-bit (3 Octets) | NIC 24-bit (3 Octets) |

To illustrate how the proposed MAC-P method works, in some embodiments, there are two main situations that are considered based the type of the data frame.
Situation-A:
    A switch device receives an ARP request frame.
    A switch device receives a broadcast frame.
Situation-B:
    A switch device receives an APR reply frame.
    A switch device receives a unicast frame.
It is assumed that the nodes in the network do not have any information about each other and the nodes communicate with each other at a Layer 2 domain. The switch devices in the network are MAC-P (V1 or V2) switch devices without standard MAC address table. Each MAC-P switch device may have a unique switch ID that is assigned either automatically by a protocol that runs between switch devices, or manually by a network administrator. Each switch port may be specified if it is an access port or a switch port depending on if the port is connected to a MAC-P switch device or not.

Considering Situation-A when a switch device receives a data frame such as for example a ARP request frame or broadcast frame. Below are described the actions belonging to situation A:
A-1:
    A source host node (Node-X) generates an ARP request message or an ARP request frame and sends it out through its port connected to a MAC-P (V1 and/or V2) switch device. This ARP request is used to find out the MAC address of a destination host node (Node-Z). Then, the source host node (Node-X) sends the frame out through its port connected to a MAC-P (V1 and/or V2) switch.
A-2:
    The next switch device (in this case the source switch device 10) receives this frame. Because the frame came from an access port, the switch considers itself a source switch device.
    The source switch device may check, if necessary, the "ether type" indicated in the received frame. If this check is done, the "ether-Type" It shows/indicates that the received frame is an ARP request frame or message. As the destination MAC ad dress field of this arrived frame is a broadcast entry, the source switch device knows this is an ARP request frame.
    The source switch device 10 knows this frame should be flooded. The frame received from the source host node (Node-X) includes a source MAC address of the source host node, and a destination MAC address;
    But before the source switch device 10 floods this frame, the source switch device 10 is configured to take the following actions, explained below in method terms:

a) modifying the received data frame by modifying a part of the source MAC address field in the received data frame with information comprising: the switch ID, a port number indicating a port of the source switch device from which the data frame is received, and a reference number representing the part of the source MAC address;

b) determining if there is a table in the source switch device:

c) if it is determined that there is a table in the source switch device, and if the table in the source switch device does not include the reference number and the part of the source MAC address;

including the reference number and the part of the source MAC address in an entry of the table;

d) if it is determined that there is no table in the source switch device;

the source switch device 10 generating a table and including in an entry of the generated table the reference number, and the part of the source MAC address.

As an exemplary embodiment, the source switch device 10 may create/generate a new table named, as an example, a OUI Table; if this table has not already been created/generated.

The source switch device 10 may assign a locally significant unique index to that OUI part of the source MAC address field of the arrived frame. Then, the source switch device 10 may map them together into the OUI Table if there is not already any index mapped to that OUI entry.

In the case of the exemplary embodiment of a OUI table that is either present or created or generated in the source switch device 10, each OUI entry is mapped to an index and vice versa. In this case, if the source switch device 10 receives another frame and the OUI part of the source MAC address field of the frame is already mapped to an index in the switch's OUI Table, the source switch device 10 does not assign a new index to that OUI, and there is no possibility to see an index assigned to more than one OUI entry or an OUI with two different indexes in a particular switch device. Mapping the index and OUI entry is locally significant in each switch device. The source switch device generates or creates a new OUI value and replaces the current OUI part of the source and sender MAC address field of the ARP request frame with this new value.

Note that The NIC part remains as it is. Here is an exemplary process of creating the new OUI value:

The source switch device 10 may divide the new OUI value into three sections to fill in with three entries. Each section may comprise one byte:

i. The leftmost part represents the source switch's ID.

ii. The middle part represents the source switch's port number; the frame arrives from there. (The port that connected to a source node)

iii. The rightmost part represents the OUI index, which is mapped to the OUI part of the source MAC address field of the arrived frame on the OUI Table.

An advantage herein is that there is no MAC address learning by the source switch device.

The source switch device 10 thus creates a new table named OUI Table; if this table has not already been created. The source switch device assigns a locally significant unique index to that OUI part of the source MAC address field of the arrived frame. Then, switch maps them together into the OUI Table if there is not already any index mapped to that OUI entry.

The procedure of the source switch device further comprises: if the received data frame is an Address Resolution Protocol (ARP) request message: the source switch device further modifying the modified data frame by replacing a sender MAC address indicated in the received data frame or in the modified data frame with the modified part of the source MAC address; and flooding, towards a destination host node, the further modified data frame, to at least one switch device of the plurality of switch devices.

As previously described, the part of the source MAC address is an Organizationally Unique Identifier (OUI), and the method comprises obtaining a switch ID for each of the plurality of switch devices which can be done beforehand manually or automatically.

A-3:

The next switch device (transit switch device 20) receives the frame from the source switch device as defined in claim 1. Since the frame comes from a switch port, this next switch is either a transit switch or a destination switch. But because this is a broadcast frame (either an ARP request or a typical broadcast), the next switch device (transit switch device 20) takes the following actions (as defined in claim 3):

The transit switch device 20 looks at the OUI part of the source MAC address field of the frame and fetches the switch ID part. Then the next switch creates a table named Switch Table if it does not already exist and imports that SW ID and the switch port that frame arrived from there into this table if there is no entry already for that SW ID. The inventor refers to this switch port as Gateway Port although other definitions may be given, such as simply a switch port.

As the next action, the next switch device 20 (transit switch device) floods the frame. Hence switch device 20 forwards or floods, towards the destination host node, (Node-Z), the modified data frame to at least one switch device of the plurality of switch devices (e.g., 21, etc.).

It should be mentioned that the transit switch device 20 looks only at the Layer 2 address part of the frame. It doesn't even check the "ether-type" field. It means the transit switch device is not concerned about the frame type and the rest part of the frame. Also, the transit switch device 20 (or 21) do not modify the data frame fields at all, and advantageously, there is no MAC address learning by any of the transit switch devices.

A-4:

All nodes connected to the switch device 20 receive this broadcast (ARP request) frame. Note that an ARP request frame can be viewed as a broadcast frame.

A-5:

The following two steps will occur when a destination host node (e.g. Node-Z) receives this ARP request frame:

Between all nodes that receive this frame, only the destination node (Node-Z) accepts the frame because it sees/recognizes its own Internet Protocol (IP) address in the Target IP address field of the ARP request frame.

The destination node updates its ARP table by mapping the frame's Sender MAC address and the sender IP address fields, both parts of the ARP request header.

Note that the sender MAC address that points to the source node's IP address is not the source node's real MAC address. It is the MAC address that the source switch has modified before the frame gets flooded.

By doing this step, the first situation for an ARP request frame is accomplished.

FIG. 2 summarizes a flowchart of a method 200 performed by a source switch device 10 for switching data frames in a communications network, according to some embodiments described earlier of the present disclosure. The communications network comprises a plurality of switch devices. The method is performed by a source switch device having a switch identity, switch ID. The method comprises the following.

210—Receiving a data frame from a source host node (such as a Node-X) that is connected to the source switch device 10, wherein the data frame includes a source MAC address of the source host node, and a destination MAC address;

220—Modifying the received data frame by modifying a part of the source MAC address field in the received data frame with information comprising: the switch ID, a port number indicating a port of the source switch device from which the data frame is received, and a reference number representing the part of the source MAC address in the received data frame;

230—determining if there is a table in the source switch device:

if it is determined that there is a table in the source switch device, and if the table in the source switch device does not include the reference number and the part of the source MAC address;

including the reference number and the part of the source MAC address in an entry of the table;

if it is determined that there is no table in the source switch device;

generating a table and including in an entry of the generated table the reference number, and the part of the source MAC address;

the method performed by the source switch device further comprising:

240—if the received data frame is an Address Resolution Protocol, ARP, request message:

further modifying the modified data frame by replacing a sender MAC address indicated in the received data frame or in the modified data frame with the modified part of the source MAC address; and 250—flooding, towards a destination host node, the further modified data frame, to at least one switch device of the plurality of switch devices.

In some embodiments, the part of the source MAC address in the received data frame is an Organizationally Unique Identifier, OUI.

In some embodiments, a switch ID is obtained for each of the plurality of switch devices.

Figure 5:
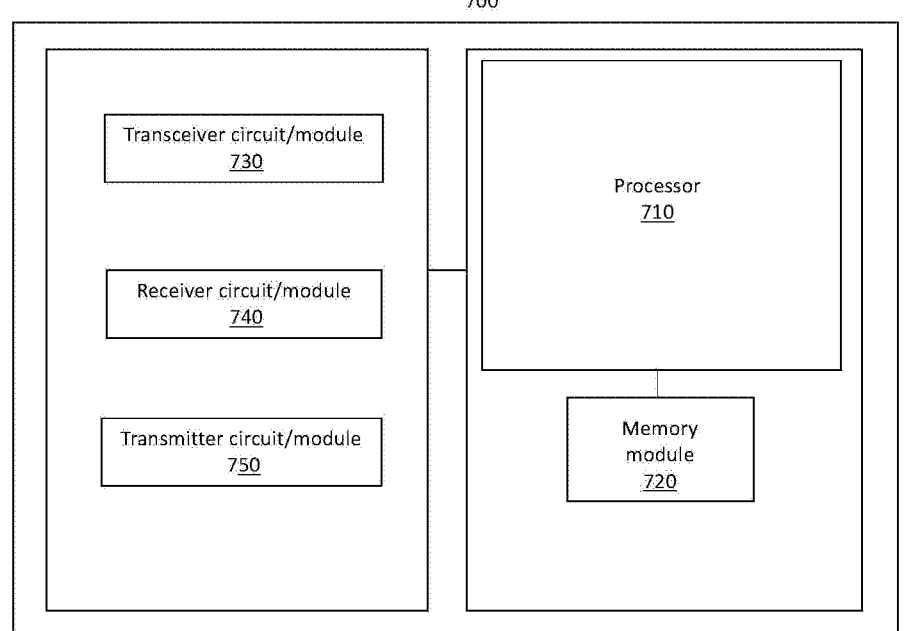
FIGS. 5-7 illustrates a block diagram of a source switch device, a transit switch device, and a destination switch device respectively, according to some embodiments herein.

To perform the method described above, a source switch device 700 is provided as shown in a simplified block diagram of FIG. 5. As shown, the source switch device 700 comprises a processing circuit or a processing module or a processor 710; a memory module 720; a receiver circuit or receiver module 740; a transmitter circuit or transmitted module 750; and a transceiver circuit or transceiver module 730 which may include the transmitter circuit 750 and the receiver circuit 740. The source switch device 700 may support any radio access technology including 2G, 3G, 4G, 5G, Wifi, Wimax or a combination thereof.

The processing module/circuit 710 includes a processor, microprocessor, an application specific integrated circuit (ASIC), field programmable gate array (FPGA), or the like, and may be referred to as the "processor 710." The processor 710 controls the operation of the source switch device and its components. Memory (circuit or module) 720 includes a random-access memory (RAM), a read only memory (ROM), and/or another type of memory to store data and instructions that may be used by processor 710. In general, it will be understood that the source switch device 700 in one or more embodiments includes fixed or programmed circuitry that is configured to carry out the operations in any of the embodiments disclosed in this disclosure including the claims related to the method performed by the source switch device.

The processor 710 is configured to execute computer program instructions from a computer program stored in a non-transitory computer-readable medium that is in or is accessible to the processing circuitry. Here, "non-transitory" does not necessarily mean permanent or unchanging storage, and may include storage in working or volatile memory, but the term does connote storage of at least some persistence. The execution of the program instructions stored in the memory specially adapts or configures the processor 710 to carry out the operations of the source switch device 700 disclosed herein. The source switch device 700, by means of processor 710, is operative to perform the actions previously described and as presented in method claims of the source switch device.

There is also provided a computer program comprising instructions which when executed on at least one processor 710 of the source switch device 700 according to embodiments herein, cause the at least one processor 710 to carry out the method previously described.

Referring to FIG. 3 there is depicted a flowchart of a method 300 performed by a transit switch device (e.g., 20, or 21) for switching data frames in a communications network, according to some embodiments of the present disclosure. The communications network comprises a plurality of switch devices including the transit switch device. The method comprises the following:

310—receiving a modified data frame from a source switch device, wherein the data frame is modified from a data frame including a source Media Access Control, MAC, address of a source host node and a destination MAC address, by modifying a part of the source MAC address in the data frame with information comprising: a switch ID, a port number indicating a port of the source switch device from which the data frame is received, and a reference number representing the part of the source MAC address in the data frame;

320—fetching from the part of the source MAC address of the received modified data frame, the switch ID;

330—determining if there is a switch table in the transit switch device;

if it is determined that there is no switch table in the transit switch device, generating a switch table, and including in the generated switch table the fetched switch ID and a port number indicating a port of the transit switch device from which the modified data frame is received;

if it is determined that there is a switch table in the transit switch device, and if the switch table in the transit switch device does not include the fetched switch ID and does not include the port number indicating the port of the transit switch device from which the modified data frame is received;

including in the switch table the fetched switch ID and the port number indicating the port of the transit switch device from which the modified data frame is received; and 340—if the received modified data frame is an Address Resolution Protocol, ARP, request message: flooding, towards a destination host node, the modified data frame to at least one switch device of the plurality of switch devices.

According to some embodiments, the part of the source MAC address in the data frame before modification is an Organizationally Unique Identifier, OUI.

According to some embodiments, the received data frame or the modified data frame comprises an ether type field indicating the type of the data frame received from the source host node.

Figure 6:
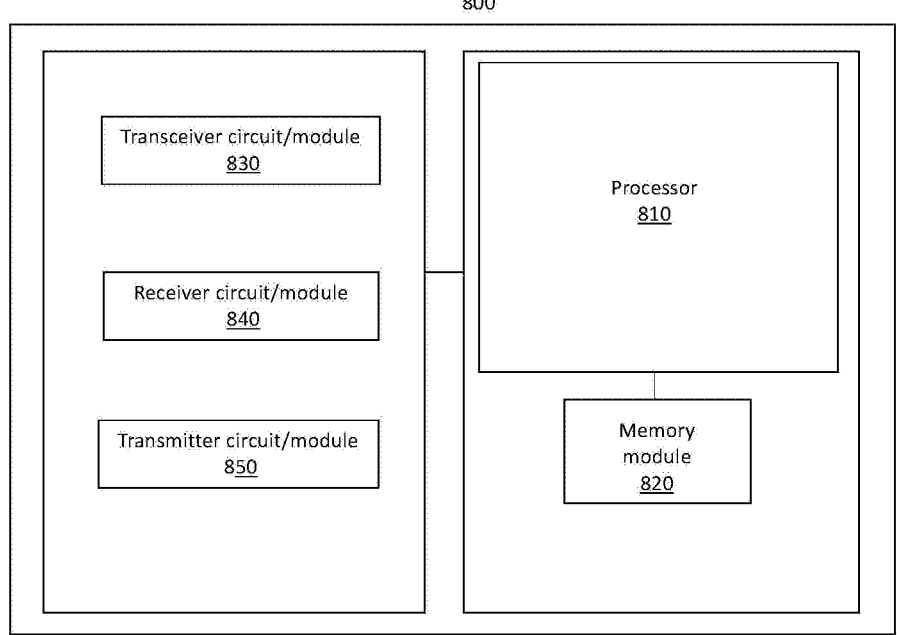

To perform the method described above, a simplified diagram of a transit switch device 800 is provided as shown in a simplified block diagram of FIG. 6. As shown, the transit switch device 800 comprises a processing circuit or a processing module or a processor 810; a memory module 820; a receiver circuit or receiver module 840; a transmitter circuit or transmitted module 850; and a transceiver circuit or transceiver module 830 which may include the transmitter circuit 850 and the receiver circuit 840. The transit switch device 800 may support any radio access technology including 2G, 3G, 4G, 5G, Wifi, Wimax or a combination thereof.

The processing module/circuit 810 includes a processor, microprocessor, an application specific integrated circuit (ASIC), field programmable gate array (FPGA), or the like, and may be referred to as the "processor 810." The processor 810 controls the operation of the transit switch device and its components. Memory (circuit or module) 820 includes a random-access memory (RAM), a read only memory (ROM), and/or another type of memory to store data and instructions that may be used by processor 810. In general, it will be understood that the transit switch device 800 in one or more embodiments includes fixed or programmed circuitry that is configured to carry out the operations in any of the embodiments disclosed in this disclosure including the claims related to the method performed by the transit switch device.

The processor 810 is configured to execute computer program instructions from a computer program stored in a non-transitory computer-readable medium that is in or is accessible to the processing circuitry. Here, "non-transitory" does not necessarily mean permanent or unchanging storage, and may include storage in working or volatile memory, but the term does connote storage of at least some persistence. The execution of the program instructions stored in the memory specially adapts or configures the processor 810 to carry out the operations of the transit switch device 800 disclosed herein.

The transit switch device 800, by means of processor 810, is operative to perform the actions previously described and as presented in method claims of the transit switch device.

There is also provided a computer program comprising instructions which when executed on at least one processor 810 of the transit switch device 800 according to embodiments herein, cause the at least one processor 810 to carry out the method previously described.

Referring to FIG. 4 there is depicted a flowchart of a method 400 performed by a destination switch device (e.g., 11) for switching data frames in a communications network, according to some embodiments of the present disclosure. The communications network comprises a plurality of switch devices including the destination switch device. The method comprises the following:

410—receiving a modified data frame from a transit switch device, wherein the modified data frame is modified from a data frame including a source Media Access Control, MAC, address of a source host node and a destination MAC address, by modifying a part of the source MAC address in the data frame with information comprising: a switch ID, a port number indicating a port of a source switch device from which the data frame is received, and a reference number representing the part of the source MAC address in the data frame;

420—fetching from a part of the source MAC address of the received modified data frame, the switch ID;

430—determining if there is a switch table in the destination switch device;

if it is determined that there is no switch table in the destination switch device:

generating a switch table, and including in the generated switch table the fetched switch ID and a port number indicating a port of the destination switch device from which the modified data frame is received;

if it is determined that there is a switch table in the destination switch device, and if the switch table in the destination switch device does not include the fetched switch ID and does not include the port number indicating the port of the destination switch device from which the modified data frame is received:

including in the switch table the fetched switch ID and the port number indicating the port of the destination switch device from which the modified data frame is received; and

440—if the received modified data frame is an Address Resolution Protocol, ARP, request message: flooding the received modified data frame to at least a destination host node device that is connected to the destination switch device.

In some embodiments, the part of the source MAC address in the data frame before modification is an Organizationally Unique Identifier, OUI.

In some embodiments, the received data frame or the modified data frame comprises an ether type field indicating the type of the data frame received from the source host node.

Figure 7:
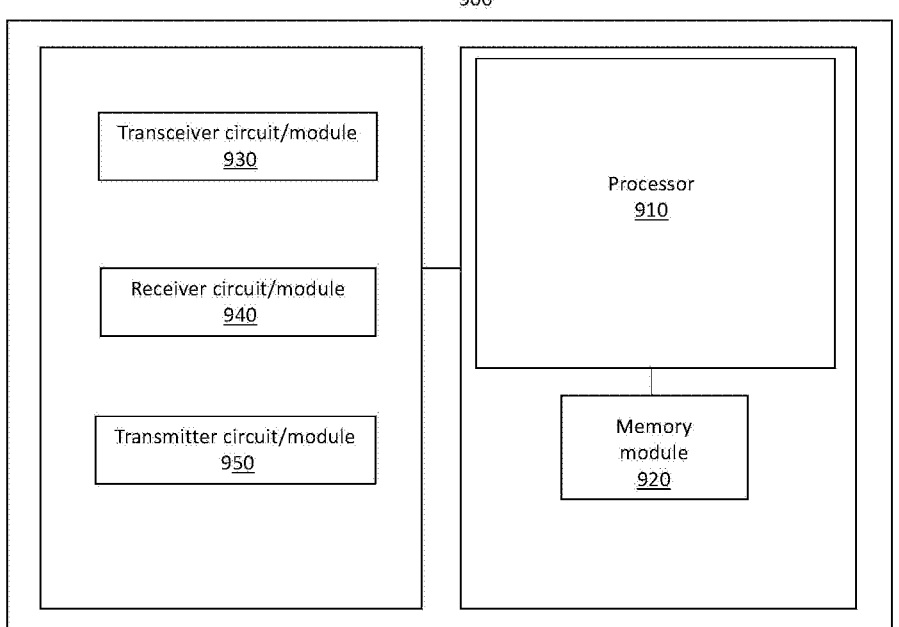

To perform the method described above, a destination switch device 900 is provided as shown in a simplified block diagram of FIG. 7. As shown, the destination switch device 900 comprises a processing circuit or a processing module or a processor 910; a memory module 920; a receiver circuit or receiver module 940; a transmitter circuit or transmitted module 950; and a transceiver circuit or transceiver module 930 which may include the transmitter circuit 950 and the receiver circuit 940. The destination switch device 900 may support any radio access technology including 2G, 3G, 4G, 5G, Wifi, Wimax or a combination thereof.

The processing module/circuit 910 includes a processor, microprocessor, an application specific integrated circuit (ASIC), field programmable gate array (FPGA), or the like, and may be referred to as the "processor 910." The processor 910 controls the operation of the destination switch device and its components. Memory (circuit or module) 920 includes a random-access memory (RAM), a read only memory (ROM), and/or another type of memory to store data and instructions that may be used by processor 910. In general, it will be understood that the destination switch device 900 in one or more embodiments includes fixed or programmed circuitry that is configured to carry out the operations in any of the embodiments disclosed in this disclosure including the claims related to the method performed by the destination switch device.

The processor 910 is configured to execute computer program instructions from a computer program stored in a non-transitory computer-readable medium that is in or is accessible to the processing circuitry. Here, "non-transitory" does not necessarily mean permanent or unchanging storage, and may include storage in working or volatile memory, but the term does connote storage of at least some persistence. The execution of the program instructions stored in the memory specially adapts or configures the processor 910 to carry out the operations of the destination switch device 900 disclosed herein. The destination switch device 900, by means of processor 910, is operative to perform the actions previously described and as presented in method claims of the destination switch device.

There is also provided a computer program comprising instructions which when executed on at least one processor 910 of the destination switch device 900 according to embodiments herein, cause the at least one processor 910 to carry out the method previously described. Now let's contemplate at the second situation, Situation-B when a switch receives an ARP reply frame.

B-1:

The source node generates an ARP reply frame and sends it out through its port connected to a switch.

B-2:

Because the frame came from an access port, the switch considers itself a source switch.

From the switch perspective, it is a unicast frame. As a further investigation, the source switch checks the "ether type" of the frame to see if this frame is a typical unicast frame or it is a unicast ARP reply frame. In our case, it is an ARP reply frame.

The procedure when a source switch receives an ARP reply frame before taking the forwarding decision is the same as when the source switch receives an ARP request frame.

a) So the source switch generates a new OUI value. The procedure is the same as when the source switch received an ARP request.

b) Then the source switch replaces the OUI part of the source and sender MAC address field of the arrived frame with this newly created OUI value.

c) It checks if this is a destination Switch or not. If it is not a destination switch, then:

d) The source switch needs to forward the frame. This is the procedure to forward a frame, whether it is an ARP reply or a typical unicast frame:

The source switch needs to know where the frame should send out. Or we can say what switch port needs to choose to send out the frame through that port.

In order to do so, the source switch looks at the destination MAC address field of the frame, specifically at the SW ID section. Then the source switch looks up this ID in its Switch Table. There should be an entry as the gateway port mapped to this SW ID. The Source switch already learned this when it received the ARP request frame.

Based on this information, the source switch sends out the frame through the gateway port, mapped to the Switch ID inside the Switch Table.

Again, there is no MAC address learning by the source switch. If, for any unexpected situation, the next switch couldn't find any entry for that SW ID in its Switch Table, the next switch floods the frame.

B-3:

The next switch receives the frame. However, because the frame comes from a switch port, this next switch is either a transit switch or a destination switch. But in either situation, the next switch takes one common action before making the forwarding decision:

The next switch looks at the OUI part inside the source MAC address field of the frame and fetches the switch ID part.

Then the next switch imports that Switch ID, and the switch port that frame arrived from there into this table if there is no entry already for that SW ID. As usual, we named this port a gateway port.

The next switch takes a different action based on whether the next switch is a transit switch or a destination switch. In order to do so, we need first to know if the switch is a transit switch or a destination switch:

The next switch looks at the switch ID entry inside the OUI part of the destination MAC address field of the frame. If this switch ID is not the same as the next switch's ID, then this next switch is a transit switch; otherwise, if the switch ID is the same as the next switch's ID, the next switch is a destination switch.

B3-a: If the next switch is a transit switch:

When the switch is a transit switch, the switch needs only to forward the frame, and there are no modification steps.

The next switch looks up the switch ID entry of the OUI part of the destination MAC address field of the frame into its Switch Table and sends out the frame through the gateway port mapped to that SW ID. No further action by the next switch (transit) is needed.

The transit switch device looks only at the Layer 2 address part of the frame. It doesn't even check the "ether-type" field. It means the transit switch doesn't care about the frame type and the rest part of the frame. Transit switch devices do not modify the data frame fields at all and there is no MAC address learning by Transit switch. This process will continue over and over until the frame arrives at a destination switch.

B3-b: The next switch is a destination switch.

The destination switch needs to modify the OUI part of the destination MAC address and target MAC address field of the frame before forwarding the frame to the destination node. Here is what the destination switch does:

Fetches port number entry from the OUI part of the destination MAC address field of the frame. This data is placed in the second section (middle byte) of the OUI part of the destination MAC address field. The destination switch uses this port to forward the frame toward the destination node.

Fetches OUI index from the OUI part of the destination MAC address field of the frame. This data is placed in the third section (rightmost byte) of the OUI part of the destination MAC address field. Then the destination switch looks up this index in its OUI table to see what OUI entry is mapped with this index.

The destination switch uses this OUI entry to replace the modified OUI part of the destination and target MAC address fields of the arrived frame with the original OUI of the MAC address of the destination node.

Now the destination switch replaces the OUI part of the destination MAC address and the target MAC address field of the arrived frame with the OUI entry that has already been fetched from its OUI Table. Note that by doing the above action, the destination switch sets the destination and target MAC address field of the frame the same as the original MAC address of the destination Node.

As the final action, the destination switch sends out the frame through the port number that was already fetched from the OUI part of the destination MAC address field of the frame.

B-4:

The following two standards will happen when the destination switch sends this frame out toward the destination node.

When the frame arrives at the destination node, the destination node accepts the frame because it sees its own MAC address in the destination MAC address field of the frame.

The destination node updates its ARP table by mapping the frame's sender MAC address and the sender IP address fields. This is the procedure when a switch receives a unicast frame:

All the procedures when a switch, including a source, transit, or destination switch, receives a typical frame are the same as when it receives an ARP reply, except for the following:

The source switch device only modifies the frame's OUI part of the source MAC address field. Because a typical unicast frame doesn't include an ARP header, which means there is no target MAC address field to be modified. The destination switch only modifies the frame's OUI part of the destination MAC address field. Because a unicast frame doesn't include an ARP header, which means there is no target MAC address field to be modified.

Here below are the conclusion about frame's modification in all examples of the above described situations:

When a source switch device receives an ARP request or an ARP reply, it modifies a part (such as the OUI part) of the data frame's source and sender MAC address field. When a source switch device receives a unicast or broadcast frame, SW-D:
   Switch ports: 1, 2, 3
   Access ports:—
      Port number 2 is not operational. It's disabled by STP.
SW-E:
   Switch ports: 1, 2, 3
   Access ports:—
      Port number 2 is not operational. It's disabled by STP.

Because this is an example of a fresh topology as the first action to initiate a communication, we assume Node-X, with the IP address of 10.0.0.2, wants to communicate with Node-Z with the IP address of 10.0.0.3. In this case, Node-X is considered a source node and Node-Z a destination node.

Node-X generates and sends out a broadcast ARP request to find out the MAC address of Node-Z. As it is an ARP request frame, we follow Situation-A:

A-1:

As a source node, Node-X wants to communicate with a destination node with the IP address of 10.0.0.3 (Node-Z).

Because Node-X doesn't have the MAC address of the destination node (10.0.0.3) in its ARP table, it needs to generate and send a broadcast ARP request in order to find out the MAC address of Node-Z:

SW-A ARP Table:

| MAC address | IP address |
| --- | --- |

ARP Request sent out by Node-X:

| Layer 2 address | | Ether | ARP Request header | | | |
| --- | --- | --- | --- | --- | --- | --- |
| Destination MAC address | Source MAC address | Type ARP | Sender MAC address | Sender IP address | Target MAC address | Target IP address |
| FF:FF:FF:FF:FF:FF | AA:AA:AA:00:00:01 | 08:06 | AA:AA:AA:00:00:01 | 10.0.0.2 | 00:00:00:00:00:00 | 10.0.0.3 | it modifies only a part (such as the OUI part) of the frame's source MAC address field. When a destination switch device receives an ARP request or a typical broadcast frame, it doesn't modify the frame. When a destination switch device receives an ARP reply frame, it modifies a part (such as the OUI part) of the frame's destination and target MAC address field. When a destination switch device receives a typical unicast frame, it modifies only a part (such as the OUI part) of the frame's destination MAC address field. A transit switch device doesn't modify the frame at all.

MAC-P (V2) Steps in Detailed are repeated below:

Each MAC-P switch needs to have a unique ID in the topology. In our case, this ID is assigned manually by a network administrator.

Switch-A (SW-A): 10
   Switch-B (SW-B): 11
   Switch-D (SW-D): 20
   Switch-E (SW-E): 21
   Each switch port should be specified if it is an access port or a switch port.
SW-A:
   Switch Ports: 1, 2
   Access Ports: 3, 4, 5, 11, 12, 13
      Port number 2 is not operational. It's disabled by STP.
SW-B:
   Switch ports: 1, 2
   Access ports: 11, 12, 13
      Port number 2 is not operational. It's disabled by STP.

A-2:

SW-A receives this frame. Because the frame came from an access port, SW-A considers itself a source switch. The source switch checks the "ether type" of the frame. It is 0806h which shows the frame is an ARP frame. As the destination MAC address field of this arrived frame is a broadcast entry, the switch knows this is an ARP request frame. The source switch knows this frame should be flooded. But before that, it needs to take the following actions:

As there is no OUI Table already in the SW-A, it creates a new one:

SW-A OUI Table:

| Index | OUI Reference |
| --- | --- |

SW-A assigns a locally significant unique index to that OUI part of the source MAC address field of the arrived frame. Then, SW-A maps them together into the OUI Table if there is not already any index mapped to that OUI entry.

SW-A OUI Table:

| Index | OUI Reference |
| --- | --- |
| 1 | AA:AA:AA |

SW-A creates a new OUI value and replaces the current OUI part of the source and sender MAC address field of the ARP request frame with this new value.

Here is the process of creating the new OUI value:

The source switch divides the new OUI value into three sections to fill in with three entries. Each section may comprise of one byte:

| OUI 24-bit (3 Octets) | | |
|---|---|---|
| Switch ID | Port Number | OUI Index |
| — | — | — |

The leftmost byte (first byte) is representative of the switch ID. In this example, it is 10.

The middle byte (second byte) is representative of the port number of the switch the frame arrives from there. In this example, it is Port-11

The rightmost byte (third byte) is representative of the OUI index from the OUI Table. In this example, it is 1.

The OUI field entries here are shown in Hex format. It is like this:

Switch ID for SW-A in Dec format is "10". It is equal to "0A" in Hex format (0Ah)

Port number of SW-A that frame arrived from there in Dec format is "11". It is equal to "0B" in Hex format (0Bh)

OUI Index that SW-A assigned to the OUI part of the source MAC address field of the arrived frame in Dec format is "1". It is equal to "01" in Hex format (01h)

Modified Source MAC Address Field by SW-A:

| Source MAC Address field 48-bit | | | |
|---|---|---|---|
| OUI 24-bit (3 Octets) | | | NIC |
| Switch ID | Port Number | OUI Index | 24-bit (3 Octets) |
| 0Ah (10) | 0Bh (11) | 01h (1) | 00:00:01 |

Here is the whole frame modified by SW-A:

| Layer 2 address | | Ether | ARP Request header | | | | |
|---|---|---|---|---|---|---|---|
| Destination MAC address | Source MAC address | Type ARP | Sender MAC address | Sender IP address | Target MAC address | Target IP address |
| FF:FF:FF:FF:FF:FF | 0A:0B:01:00:00:01 | 08:06 | 0A:0B:01:00:00:01 | 10.0.0.2 | 00:00:00:00:00:00 | 10.0.0.3 |

Then SW-A floods the frame.

A-3:

The next switch. SW-D receives the frame. However, SW-D is either a transit or destination switch because the frame comes from a switch port. But because this is a broadcast frame, the next switch takes the same action in either situation. The transit switch only looks at the Layer 2 address part of the frame.

| Layer 2 address | |
|---|---|
| Destination MAC address | Source MAC address |
| FF:FF:FF:FF:FF:FF | 0A:0B:01:00:00:01 |

SW-D looks at the OUI part of the source MAC address field of the frame and fetches the switch ID part. In our example, it is 0Ah (10). As no Switch Table exists in the switch ID, it creates one and imports that SW ID and the switch port that frame arrived from there into this table.

SW-D Switch Table:

| Switch ID | Gateway port |
|---|---|
| 0Ah (10) | 1 |

Because this is a broadcast frame, SW-D floods this frame.

The transit switch, SW-D, only looks at the Layer 2 address part of the frame. It doesn't even check the "ethertype" field (i.e., an ether type field). It means the transit switch doesn't care about the frame type and the rest part of the frame. Transit switches do not modify the data frame fields at all. There is no MAC address learning by Transit switch.

The next switch, SW-E receives this frame. SW-E does the same as SW-D did. It means no change on the frame and updates the Switch Table based on the switch ID inside the OUI part of the source MAC address field of the frame.

| Layer 2 address | |
|---|---|
| Destination MAC address | Source MAC address |
| FF:FF:FF:FF:FF:FF | 0A:0B:01:00:00:01 |

SW-E Switch Table:

| Switch ID | Gateway port |
|---|---|
| 0Ah (10) | 3 |

And as it is a broadcast frame, it floods the frame.

The next switch, SW-B receives this frame. SW-B does the same as SW-E did. It means no change on the frame and updates the Switch Table, and as it is a broadcast frame, it floods the frame:

SW-B Switch Table:

| Switch ID | Gateway port |
|---|---|
| 0Ah (10) | 1 |

A-4:

All nodes connected to SW-B, including Node-Z, receive this frame.

| Layer 2 address | | Ether | ARP Request header | | | |
|---|---|---|---|---|---|---|
| Destination MAC address | Source MAC address | Type ARP | Sender MAC address | Sender IP address | Target MAC address | Target IP address |
| FF:FF:FF:FF:FF:FF | 0A:0B:01:00:00:01 | 08:06 | 0A:0B:01:00:00:01 | 10.0.0.2 | 00:00:00:00:00:00 | 10.0.0.3 |

A-5:

The following two standards steps will happen when Node-Z receives this ARP request frame:

1) Between all nodes that receive this frame, only Node-Z accepts the frame because it sees its own IP address, 10.0.0.3 in the Target IP address field of the ARP request frame.

2) The destination node updates its ARP table by mapping the frame's Sender MAC address and the sender IP address fields both parts of the ARP request frame.

Node-Z ARP Table:

| MAC address | IP address |
|---|---|
| 0A:0B:01:00:00:01 | 10.0.0.2 |

Note:

As we see, the MAC address that points to the IP address of the Node-X (source node) is not the real MAC address of the Node-X. The MAC address has been modified by the source switch, SW-A, before the frame gets flooded. By doing this step, the first situation for an ARP request frame gets done.

B-1:

Now Node-Z needs to respond to that ARP request. To do that, it generates a unicast ARP reply to send out to the Node-X. This is totally a standard procedure.

ARP Reply generated by Node-Z:

The procedure when a source switch receives an ARP reply frame before taking the forwarding decision is the same as when the source switch receives an ARP request frame.

The SW-B assigns a locally significant unique index to that OUI part of the source MAC address field of the arrived frame. Then, it maps them together into the OUI Table if there is not already any index mapped to that OUI entry.

SW-B OUI Table:

| Index | OUI Reference |
|---|---|
| 1 | BB:BB:BB |

Then the source switch generates a new OUI for the frame's source and sender MAC address field.

SW-B replaces the OUI part of the source and sender MAC address field of the arrived frame with a newly created OUI value. The procedure is the same when the source switch receives an ARP request frame before taking the forwarding decision: The leftmost part represents the source switch's ID. In our example, it is 0Bh (11). The middle part represents the source switch's port number; the frame arrives from there. (The port that connected to a source node) In our example, it is 0Dh (13). The rightmost part represents the OUI index, which is mapped to the OUI part

| Layer 2 address | | Ether | ARP Reply header | | | |
|---|---|---|---|---|---|---|
| | | | | Sender | | Target |
| Destination MAC address | Source MAC address | Type ARP | Sender MAC address | IP address | Target MAC address | IP address |
| 0A:0B:01:00:00:01 | BB:BB:BB:00:00:01 | 08:06 | BB:BB:BB:00:00:01 | 10.0.0.3 | 0A:0B:01:00:00:01 | 10.0.0.2 |

It should be noted that

This time the source and sender MAC address fields of this ARP reply frame are the MAC address of Node-Z.

The destination and Target MAC address fields of this ARP reply frame are respectively the source and sender MAC address of the arrived ARP request frame.

The sender and target IP address also set based on the IP address of Node-Z as the source and Node-X as the destination nodes.

B-2:

Because the frame came from an access port, it considers itself a source switch.

From the SW-B perspective, it is a unicast frame. As a further investigation, the source switch checks the "ether type" of the frame to see if this frame is a general unicast frame or it is a unicast ARP reply frame. Based on the ether type entry (0806h) and as it is a unicast frame, SW-B sees this frame as an ARP reply frame of the source MAC address field of the arrived frame on the OUI Table. In our example, it is 01h (01)

Modified Source MAC Address Field of the Arrived Frame by SW-B

| Source MAC Address field 48-bit | | | |
|---|---|---|---|
| OUI | | | |
| 24-bit (3 Octets) | | | NIC |
| Switch ID | Port Number | OUI Index | 24-bit (3 Octets) |
| 0Bh (11) | 0Dh (13) | 01h (1) | 00:00:01 |

Here is the data frame that SW-B prepared:

| Layer 2 address | | Ether | | ARP Reply header | | | |
|---|---|---|---|---|---|---|---|
| Destination MAC address | Source MAC address | Type ARP | Source MAC address | Sender IP address | Target MAC address | Target IP address |
| 0A:0B:01:00:00:01 | 0B:0D:01:00:00:01 | 08:06 | 0B:0D:01:00:00:01 | 10.0.0.3 | 0A:0B:01:00:00:01 | 10.0.0.2 |

Then SW-B needs to forward the frame as follows. The forwarding procedure of the frame is the same for both situations if the frame is a typical unicast frame or a unicast ARP reply frame.

SW-B needs to know where the frame should send out. Or we can say what switch port needs to choose to send out the frame through that port.

In order to do so, the SW-B looks at the destination MAC address field of the frame, specifically at the SW ID section; in our example, it is 0Ah (10):

| Destination MAC address |
|---|
| 0A:0B:01:00:00:01 |

Then SW-B looks up this ID in its Switch Table. There should be an entry as the gateway port mapped to this SW ID. SW-B already learned this when it received the broadcast frame.

SW-B Switch Table:

| Switch ID | Gateway port |
|---|---|
| 0Ah (10) | 1 |

Based on this information, the source switch sends the frame through the gateway port, mapped to the SW ID inside the Switch Table, port 1.

Note:

SW-B forwards the frame based on the above step if SW-B is not a source and destination switch at the same time.

If the switch has both source and destination roles at the same time, in this case, before forwarding the frame to the destination node, the switch needs additionally replace the OUI part of the destination and target MAC address field of the frame with the original OUI entry of the MAC address of the destination node*.

B3(i):

The next switch, SW-E receives the frame. However, because the frame comes from a switch port, SW-E is either a transit switch or a destination switch. But in either situation, it takes one common action before making the forwarding decision:

Note:

The transit switch only looks at the Layer 2 address part of the frame.

| Layer 2 address | |
|---|---|
| Destination MAC address | Source MAC address |
| 0A:0B:01:00:00:01 | 0B:0D:01:00:00:01 |

SW-E looks at the OUI part inside the source MAC address field of the frame and fetches the switch ID part. In our example, it is 0Bh (11)

Then SW-E imports that switch ID, and the switch port that frame arrived from there (Port 1) into this table if there is no entry already for that SW ID.

SW-E Switch Table:

| Switch ID | Gateway port |
|---|---|
| 0Ah (10) | 3 |
| 0Bh (11) | 1 |

SW-E takes a different action based on whether the next switch is a transit switch or a destination switch. In order to do so, we need first to know if SW-E is a transit switch or a destination switch:

SW-E looks at the SW ID entry inside the OUI part of the destination MAC address field of the frame. In our example, it is 0Ah (10)

| Destination MAC address |
|---|
| 0A:0B:01:00:00:01 |

Because this switch ID, 0Ah (10), is not the same as the ID of the SW-E, 15h, (21) this next switch is a transit switch.

B3(i)-a:

In this case, SW-E looks up the SW ID entry of the OUI part of the destination MAC address field of the frame, 0Ah (10), into its Switch Table:

SW-E Switch Table:

| Switch ID | Gateway port |
|---|---|
| 0Ah (10) | 3 |
| 0Bh (11) | 1 |

And sends out the frame through the gateway port (port 3) mapped to that SW ID. No further action by the next switch (transit) is needed.

B3(ii):

The next switch, SW-D receives the frame. However, SW-D is either a transit or destination switch because the frame comes from a switch port. But in either situation, SW-D it takes one common action before making the forwarding decision:

SW-D looks at the OUI part inside the source MAC address field of the frame and fetches the switch ID part. In our example, it is 0Bh (11)

| Source MAC address |
| --- |
| 0B:0D:01:00:00:01 |

Then SW-D imports that SW-D, and the switch port that frame arrived from there (Port 3) into this table if there is no entry already for that SW ID.

SW-D Switch Table:

| Switch ID | Gateway port |
| --- | --- |
| 0Ah (10) | 1 |
| 0Bh (11) | 3 |

SW-D takes a different action based on whether the next switch is a transit switch or a destination switch. In order to do so, we need first to know if SW-D is a transit switch or a destination switch:

SW-D looks at the switch ID entry inside the OUI part of the destination MAC address field of the frame. In our example, it is 0Ah (10)

| Destination MAC address |
| --- |
| 0A:0B:01:00:00:01 |

Because this SW ID, 0Ah, is not the same as the ID of the SW-D, 14h (20), this next switch is a transit switch.

B3(ii)-a:

In this case, SW-D looks up the switch ID entry of the OUI part of the destination MAC address field of the frame, 0Ah (10), into its Switch Table:

SW-D Switch Table:

| Switch ID | Gateway port |
| --- | --- |
| 0Ah (10) | 1 |
| 0Bh (11) | 3 |

And sends out the frame through the gateway port (port 1) mapped to that switch ID. No further action by the next switch (transit) is needed.

B3 (iii)-a:

The next switch, SW-A receives the frame. However, SW-A is either a transit or destination switch because the frame comes from a switch port. But in either situation, SW-A takes one common action before making the forwarding decision:

SW-A looks at the OUI part inside the source MAC address field of the frame and fetches the switch ID part. In our example, it is 0Bh (11)

| Source MAC address |
| --- |
| 0B:0D:01:00:00:01 |

Then SW-A imports that switch ID, and the switch port that frame arrived from there (Port 1) into this table if there is no entry already for that switch ID.

SW-A Switch Table:

| Switch ID | Gateway port |
| --- | --- |
| 0Bh (11) | 1 |

SW-A takes a different action based on whether the next switch is a transit switch or a destination switch. In order to do so, we need first to know if SW-A is a transit switch or a destination switch:

SW-A looks at the switch ID entry inside the OUI part of the destination MAC address field of the frame. In our example, it is 0Ah (10)

| Destination MAC address |
| --- |
| 0A:0B:01:00:00:01 |

Because this SW ID, 0Ah, is the same as the SW-A, 0Ah (10) ID, this next switch is a destination switch.

B3-b:

When the next switch is a destination switch:

The destination switch, SW-A needs to modify the OUI part of the destination MAC address and Target MAC address field of the frame before forwarding the frame to the destination node.

| | | | ARP Reply header | | | | |
| --- | --- | --- | --- | --- | --- | --- | --- |
| Layer 2 address | | Ether | | Sender | | | Target |
| Destination MAC address | Source MAC address | Type ARP | Sender MAC address | IP address | Target MAC address | | IP address |
| 0A:0B:01:00:00:01 | 0B:0D:01:00:00:01 | 08:06 | 0B:0D:01:00:00:01 | 10.0.0.3 | 0A:0B:01:00:00:01 | | 10.0.0.2 |

Here is what the destination switch (SW-A) does:

Fetches port number entry from the OUI part of the destination MAC address field of the frame. This data is placed in the second section (middle byte) of the OUI part of the destination MAC address field. In our case, it is 0Bh (11)

SW-A uses this port number later to forward the frame through the port where the destination node is connected.

| Destination MAC address |
| --- |
| 0A:0B:01:00:00:01 |

Fetches OUI index from the OUI part of the destination MAC address field of the frame. This data is placed in the third section (rightmost byte) of the OUI part of the destination MAC address field. In our case, it is "01h" (1).

| Destination MAC address |
| --- |
| 0A:0B:01:00:00:01 |

Then the SW-A looks up this index in its OUI Table to see what OUI entry is mapped with this index. SW-A uses this entry to replace the modified OUI part of the destination MAC address field of the arrived frame with the original OUI of the MAC address of the destination node. In our example, it is AA:AA:AA SW-A OUI Table:

| Index | OUI Reference |
| --- | --- |
| 1 | AA:AA:AA |

Now the SW-A replaces the OUI part of the destination MAC address and Target MAC address field of the arrived frame with the OUI entry that has already been looked up from its OUI Table. So the newly modified frame looks like this:

| Layer 2 address | | Ether | ARP Reply header | | | | |
| --- | --- | --- | --- | --- | --- | --- | --- |
| Destination MAC address | Source MAC address | Type ARP | Sender MAC address | Sender IP address | Target MAC address | Target IP address |
| AA:AA:AA:00:00:01 | 0B:0D:01:00:00:01 | 08:06 | 0B:0D:01:00:00:01 | 10.0.0.3 | AA:AA:AA:00:00:01 | 10.0.0.2 |

As we see, the frame's modified destination MAC address and target MAC address field is the real MAC address of the destination node, Node-X.

As the final action, the SW-A sends out the frame through port number 11, which was already fetched from the OUI part of the destination MAC address field of the arrived frame.

| Destination MAC address |
| --- |
| 0A:0B:01:00:00:01 |

B-4:

The following two standard things will happen when SW-A sends this frame out on its port number 11.

| Layer 2 address | | Ether | ARP Reply header | | | | |
| --- | --- | --- | --- | --- | --- | --- | --- |
| Destination MAC address | Source MAC address | Type ARP | Sender MAC address | Sender IP address | Target MAC address | Target IP address |
| AA:AA:AA:00:00:01 | 0B:0D:01:00:00:01 | 08:06 | 0B:0D:01:00:00:01 | 10.0.0.3 | AA:AA:AA:00:00:01 | 10.0.0.2 |

When the frame arrives at the Node-X, Node-X accepts the frame because it sees its own MAC address in the destination MAC address field of the frame.

Node-X updates its ARP table by mapping the frame's sender MAC address and the sender IP address fields. These entries will be used later to point to Node-Z.

SW-A ARP Table:

| MAC address | IP address |
| --- | --- |
| OB:OD:01:00:00:01 | 10.0.0.3 |

By doing the above process, we finalized a two-way communication when the ARP request and ARP reply frame were transferred between two nodes. So now, each node has the MAC address of the other node, and they are ready to start the communication by sending/receiving the typical unicast frame.

A procedure when a unicast frame is transmitted is described below.

As a source node, Node-X wants to communicate with a destination node with the IP address of 10.0.0.3 (Node-Z).

Because Node-X already has the MAC address of the destination node with the IP address of 10.0.0.3, in its ARP table, it directly uses that MAC address as the destination MAC address filed to generate a data frame. No need to send an ARP request anymore.

SW-A ARP Table:

| MAC address | IP address |
| --- | --- |
| OB:OD:01:00:00:01 | 10.0.0.3 |

In this case, the generated frame by Node-X will be a typical unicast frame.

The typical unicast frame generated by Node-X looks like this:

| Layer 2 address | | Ether | Payload |
| --- | --- | --- | --- |
| Destination MAC address | Source MAC address | Type Ethernet | (Including L3 header) |
| OB:OD:01:00:00:01 | AA:AA:AA:00:00:01 | 88:70 | |

As we see, this MAC address is the modified MAC address of the Node-Z and not the real one.

The source MAC address is the real MAC address of the Node-X ether-type can be anything other than 08:06 because this is not an ARP frame anymore. As an example, it is 88:70 here, which shows this is an ethernet frame.

As it is not an ARP frame, we just focus on the L2 address and the "ethertype" part of the frame. We don't care anymore about the rest of part of the frame (Le header and the payload)

Now the SW-A receives this frame. The procedure here is very similar to when a source switch receives an ARP reply. (The situation is explained in step B2)

Let's have a quick review:

Because the frame came from an access port, SW-A considers itself a source switch.

| Layer 2 address | | Ether | Payload |
|---|---|---|---|
| Destination MAC address | Source MAC address | Type Ethernet | (Including L3 header) |
| OB:OD:01:00:00:01 | AA:AA:AA:00:00:01 | 88:70 | |

From the SW-A perspective, it is a unicast frame. As a further investigation, the source switch checks the "ether type" of the frame to see if this frame is a typical unicast frame or it is a unicast ARP reply frame. As the "ether-type" is not 0806h, the frame is a typical unicast frame. The SW-A needs to assign a locally significant unique index to that OUI part of the source MAC address field of the arrived frame. But because Node-X already has such an entry in its OUI table, there is no need for any action in this step.

SW-A OUI Table:

| Index | OUI Reference |
|---|---|
| 1 | AA:AA:AA |

So the SW-A generates a new OUI for the frame's source and sender MAC address field.

SW-A modifies only the OUI part of the source MAC address field of the frame (because there is no Sender MAC address field in the standard unicast frame).

Here is the data frame that SW-A prepared:

| Layer 2 address | | Ether | Payload |
|---|---|---|---|
| Destination MAC address | Source MAC address | Type Ethernet | (Including L3 header) |
| OB:0D:01:00:00:01 | 0A:0B:01:00:00:01 | 88:70 | |

Then SW-A needs to forward the frame. SW-A needs to know where the frame should send out.

In order to do so, the SW-A looks at the destination MAC address field of the frame, specifically at the SW ID section; in our example, it is 0Bh (11):

| Destination MAC address |
|---|
| OB:OD:01:00:00:01 |

Then SW-A looks up this ID in its Switch Table. There should be an entry as the gateway port mapped to this SW ID. SW-A already learned this when it received the ARP Reply frame.

SW-A Switch Table:

| Switch ID | Gateway port |
|---|---|
| 0Bh (11) | 1 |

Based on this information, the source switch sends the frame through the gateway port, mapped to the SW ID inside the Switch Table, port 1.

SW-A forwards the frame based on the above step if SW-A is not a source and destination switch at the same time.

If the switch has both source and destination roles at the same time, in this case, before forwarding the frame to the destination node, the switch needs additionally replace the OUI part of the destination MAC address field of the frame with the original OUI entry of the MAC address of the destination node*.

The next switch. SW-D receives the frame. As the first step:

SW-D looks at the OUI part of the source MAC address field of the frame and fetches the switch ID part. In our example, it is 0Ah (11).

| Layer 2 address | |
|---|---|
| Destination MAC address | Source MAC address |
| 0B:0D:01:00:00:01 | 0A:0B:01:00:00:01 |

Because SW-D already has Switch Table and an entry for this switch ID, it doesn't need to do any action in this step.

SW-D Switch Table:

| Switch ID | Gateway port |
|---|---|
| 0Ah (10) | 1 |
| 0Bh (11) | 3 |

SW-D takes a different action based on whether the next switch is a transit switch or a destination switch.

In order to do so, we need first to know if switch ID is a transit switch or a destination switch:

SW-D looks at the switch ID entry inside the OUI part of the destination MAC address field of the frame. In our example, it is 0Bh (11).

| Destination MAC address |
|---|
| 0B:0D:01:00:00:01 |

Because this switch ID, 0Bh (11), is not the same as the ID of SW-D, 14h(20), this next switch is a transit switch.

When the switch is a transit switch, the switch needs only to forward the frame and there are no modification steps.

As it is a unicast frame (either a typical or ARP reply unicast frame), SW-D looks at its Switch Table to see where the frame should be forwarded.

As already mentioned, the transit switch doesn't care about the type of frame. It just updates its switch table and makes the forwarding decision based on the destination MAC address field of the frame.

In this case, SW-D fetches the SW ID entry inside the OUI part of the destination MAC address field of the frame. Then it looks up this entry in its Switch table to find out the gateway port.

| Layer 2 address | |
| --- | --- |
| Destination MAC address | Source MAC address |
| 0B:0D:01:00:00:01 | 0A:0B:01:00:00:01 |

SW-D Switch Table:

| Switch ID | Gateway port |
| --- | --- |
| 0Ah (10) | 1 |
| 0Bh (11) | 3 |

Now SW-D sends the frame out on port number 3.

The next switch, SW-E receives the frame. SW-E follows exactly the same procedure SW-D did and forward the frame through port number 1.

The next switch, SW-B receives this frame.

SW-B looks at the OUI part of the source MAC address field of the frame and fetches the switch ID part. In our example, it is 0Ah (11).

| Layer 2 address | |
| --- | --- |
| Destination MAC address | Source MAC address |
| 0B:0D:01:00:00:01 | 0A:0B:01:00:00:01 |

Because SW-B already has Switch Table and an entry for this switch ID, it doesn't need to do any action in this step. SW-B Switch Table:

| Switch ID | Gateway port |
| --- | --- |
| 0Ah (10) | 1 |

SW-B takes a different action based on whether the next switch is a transit switch or a destination switch.

In order to do so, we need first to know if SW-B is a transit switch or a destination switch:

SW-B looks at the SW ID entry inside the OUI part of the destination MAC address field of the frame. In our example, it is 0Bh (11)

| Destination MAC address |
| --- |
| 0B:0D:01:00:00:01 |

Because this switch ID, 0Bh (11), is the same as the ID of SW-B, this next switch is a destination switch.

In this case, the destination switch, SW-B needs to modify only the OUI part of the destination MAC address field of the frame before forwarding the frame to the destination node.

| Layer 2 address | | Ether | |
| --- | --- | --- | --- |
| Destination MAC address | Source MAC address | Type | Payload (Including Ethernet L3 header) |
| 0B:0D:01:00:00:01 | 0A:0B:01:00:00:01 | 88:70 | |

Here is what the destination switch (SW-B) does:

Fetches port number entry from the OUI part of the destination MAC address field of the frame. In our case, it is 0Dh (13). SW-B uses this to forward the frame to the destination later when it modifies the destination MAC address.

| Destination MAC address |
| --- |
| 0B:0D:01:00:00:01 |

Fetches OUI index from the OUI part of the destination MAC address field of the frame. In our case, it is "01h" (1)

Then the SW-B looks up this index in its OUI Table to see what OUI entry is mapped with this index. In our example, it is BB:BB:BB SW-B OUI Table:

| Index | OUI Reference |
| --- | --- |
| 1 | BB:BB:BB |

Now the SW-B replaces the whole OUI part of the destination MAC address field of the arrived frame with the OUI entry that has already been looked up from its OUI Table. So the newly modified frame looks like this:

| Layer 2 address | | Ether | |
| --- | --- | --- | --- |
| Destination MAC address | Source MAC address | Type | Payload (Including Ethernet L3 header) |
| BB:BB:BB:00:00:01 | 0A:0B:01:00:00:01 | 88:70 | |

As we see, the frame's modified destination MAC address field is the real MAC address of the destination node, Node-X.

As the final action, the SW-B sends out the frame through port number 13, which was already fetched from the OUI part of the destination MAC address field of the frame.

| Destination MAC address |
| --- |
| 0B:0D:01:00:00:01 |

The following two standard things will happen when SW-B sends this frame out on its port number 11.

When the frame arrives at the destination node, Node-Z, Node-Z accepts the frame because it sees its own MAC address in the destination MAC address field of the frame.

| Layer 2 address | | Ether | | |
| --- | --- | --- | --- | --- |
| Destination MAC address | Source MAC address | Type | Payload (Including Ethernet L3 header) | |
| BB:BB:BB:00:00:01 | 0A:0B:01:00:00:01 | 88:70 | | |

Node-X doesn't need to update its ARP table because it already has an entry mapped for the source IP address, 10.0.0.2, inside the L3 header part of the arrived frame. SW-B ARP Table:

| MAC address | IP address |
| --- | --- |
| 0A:0B:01:00:00:01 | 10.0.0.2 |

Throughout this disclosure, the word "comprise" or "comprising" has been used in a non-limiting sense, i.e., meaning "consist at least of". Although specific terms may be employed herein, they are used in a generic and descriptive sense only and not for purposes of limitation. As described, the embodiments herein may be applied in any wireless systems including LTE or 4G, LTE-A (or LTE-Advanced), 5G, WiMAX, WiFi, satellite communications, TV broadcasting etc. that may employ beamforming technology.

The invention claimed is:

1. A method performed by a source switch device for switching data frames in a communications network comprising a plurality of switch devices including the source switch device; the source switch device having a switch identity (switch ID);

wherein the method comprises:

receiving a data frame from a source host node that is connected to the source switch device, wherein the data frame includes a source Media Access Control (MAC) address of the source host node, and a destination MAC address;

modifying the received data frame by modifying a part of the source MAC address in the received data frame with information comprising: the switch ID, a port number indicating a port of the source switch device from which the data frame is received, and a reference number representing the part of the source MAC address in the received data frame; and determining if there is a table in the source switch device:

if it is determined that there is a table in the source switch device, and if the table in the source switch device does not include the reference number and the part of the source MAC address:

including the reference number and the part of the source MAC address in an entry of the table;

if it is determined that there is no table in the source switch device:

generating a table and including in an entry of the generated table the reference number, and the part of the source MAC address;

wherein the method performed by the source switch device further comprises:

if the received data frame is an Address Resolution Protocol (ARP) request message:

further modifying the modified data frame by replacing a sender MAC address indicated in the received data frame or in the modified data frame with the modified part of the source MAC address; and flooding, towards a destination host node, the further modified data frame, to at least one switch device of the plurality of switch devices.

2. The method according to claim 1, wherein, the part of the source MAC address in the received data frame is an Organizationally Unique Identifier (OUI).

3. The method according to claim 1, wherein a switch ID is obtained for each of the plurality of switch devices.

4. A source switch device for switching data frames in a communications network comprising a plurality of switch devices including the source switch device, the source switch device having a switch identity (switch ID), the source switch device comprising a processor and a memory, the memory containing instructions executable by the processor whereby the source switch device is operative to:

receive a data frame from a source host node that is connected to the source switch device, wherein the data frame includes a source Media Access Control (MAC) address of the source host node, and a destination MAC address;

modify the received data frame by modifying a part of the source MAC address in the received data frame with information comprising: the switch ID, a port number indicating a port of the source switch device from which the data frame is received, and a reference number representing the part of the source MAC address in the received data frame;

determine if there is a table in the source switch device:

if it is determined that there is a table in the source switch device, and if the table in the source switch device does not include the reference number and the part of the source MAC address:

include the reference number and the part of the source MAC address in an entry of the table;

if it is determined that there is no table in the source switch device:

generate a table and including in an entry of the generated table the reference number, and the part of the source MAC address; and if the received data frame is an Address Resolution Protocol (ARP) request message:

further modify the modified data frame by replacing a sender MAC address indicated in the received data frame or in the modified data frame with the modified part of the source MAC address; and flood, towards a destination host node, the further modified data frame, to at least one switch device of the plurality of switch devices.

5. The source switch device according to claim 4, wherein the part of the source MAC address in the received data frame is an Organizationally Unique Identifier (OUI).

6. The source switch device according to claim 4, wherein a switch ID is obtained for each of the plurality of switch devices.

7. A transit switch device for switching data frames in a communications network comprising a plurality of switch devices including the transit switch device, wherein the transit switch device comprising a processor and a memory, the memory containing instructions executable by the processor whereby the transit switch device is operative to:

receive a modified data frame from a source switch device, wherein the data frame is modified from a data frame including a source Media Access Control (MAC), address of a source host node and a destination MAC address, by modifying a part of the source MAC address in the data frame with information comprising: a switch ID, a port number indicating a port of the source switch device from which the data frame is received, and a reference number representing the part of the source MAC address in the data frame;

fetch from the part of the source MAC address of the received modified data frame, the switch ID;

determine if there is a switch table in the transit switch device:

if it is determined that there is no switch table in the transit switch device:

generate a switch table, and include in the generated switch table the fetched switch ID and a port number indicating a port of the transit switch device from which the modified data frame is received;

if it is determined that there is a switch table in the transit switch device, and if the switch table in the transit switch device does not include the fetched switch ID and does not include the port number indicating the port of the transit switch device from which the modified data frame is received:

include in the switch table the fetched switch ID and the port number indicating the port of the transit switch device from which the modified data frame is received; and if the received modified data frame is an Address Resolution Protocol (ARP) request message:

flood, towards a destination host node, the modified data frame to at least one switch device of the plurality of switch devices.

8. The transit switch device according to claim 7, wherein, the part of the source MAC address in the data frame before modification is an Organizationally Unique Identifier (OUI).

9. A destination switch device for switching data frames in a communications network comprising a plurality of switch devices including the destination switch device, wherein the destination switch device comprising a processor and a memory, and the memory containing instructions executable by the processor whereby the destination switch device is operative to:

receive a modified data frame from a transit switch device, wherein the modified data frame is modified from a data frame including a source Media Access Control (MAC) address of a source host node and a destination MAC address, by modifying a part of the source MAC address in the data frame with information comprising: a switch ID, a port number indicating a port of a source switch device from which the data frame is received, and a reference number representing the part of the source MAC address in the data frame;

fetch from a part of the source MAC address of the received modified data frame, the switch ID;

determine if there is a switch table in the destination switch device:

if it is determined that there is no switch table in the destination switch device:

generate a switch table, and include in the generated switch table the fetched switch ID and a port number indicating a port of the destination switch device from which the modified data frame is received;

if it is determined that there is a switch table in the destination switch device, and if the switch table in the destination switch device does not include the fetched switch ID and does not include the port number indicating the port of the destination switch device from which the modified data frame is received:

include in the switch table the fetched switch ID and the port number indicating the port of the destination switch device from which the modified data frame is received; and if the received modified data frame is an Address Resolution Protocol (ARP) request message:

flood the received modified data frame to at least a destination host node device that is connected to the destination switch device.

10. The destination switch device according to claim 9, wherein the part of the source MAC address in the data frame before modification is an Organizationally Unique Identifier (OUI).

11. The destination switch device according to claim 9, wherein the received data frame or the modified data frame comprises an ether type field indicating the type of the data frame received from the source host node.

* * * * *